US008045650B2

(12) United States Patent  (10) Patent No.: US 8,045,650 B2
Nakatani  (45) Date of Patent: Oct. 25, 2011

(54) RADIO RECEIVING APPARATUS

(75) Inventor: Toshifumi Nakatani, Osaka (JP)

(73) Assignee: Panasonic Corporation, Osaka (JP)

( * ) Notice: Subject to any disclaimer, the term of this patent is extended or adjusted under 35 U.S.C. 154(b) by 880 days.

(21) Appl. No.: 11/916,241

(22) PCT Filed: Jun. 15, 2006

(86) PCT No.: PCT/JP2006/312038
§ 371 (c)(1),
(2), (4) Date: Nov. 30, 2007

(87) PCT Pub. No.: WO2006/137325
PCT Pub. Date: Dec. 28, 2006

(65) Prior Publication Data
US 2010/0189197 A1  Jul. 29, 2010

(30) Foreign Application Priority Data

Jun. 24, 2005  (JP) .................................. 2005-185562

(51) Int. Cl.
*H04B 1/26* (2006.01)
*H04L 27/06* (2006.01)
(52) U.S. Cl. .......................... 375/340; 375/316; 375/324
(58) Field of Classification Search .................. 375/340, 375/316, 344, 261, 329; 329/311, 300, 304; 341/126
See application file for complete search history.

(56) References Cited

U.S. PATENT DOCUMENTS

| | | | |
|---|---|---|---|
| 6,208,294 B1 * | 3/2001 | Kobayakawa et al. | 342/373 |
| 6,748,026 B1 * | 6/2004 | Murakami et al. | 375/316 |
| 2002/0158990 A1 | 10/2002 | Kishi | |
| 2003/0012260 A1 * | 1/2003 | Walley et al. | 375/146 |
| 2004/0029550 A1 | 2/2004 | Kishi | |
| 2004/0121738 A1 * | 6/2004 | Ide | 455/82 |

(Continued)

FOREIGN PATENT DOCUMENTS

JP  01-190015  7/1989

(Continued)

OTHER PUBLICATIONS

International Search Report issued Aug. 15, 2006 in the International (PCT) Application of which the present application is the U.S. National Stage.

*Primary Examiner* — Shuwang Liu
*Assistant Examiner* — Helene Tayong
(74) *Attorney, Agent, or Firm* — Wenderoth, Lind & Ponack, L.L.P.

(57) ABSTRACT

A radio receiving apparatus capable of making compensation for both amplitude variations and phase variations and of suppressing image interference in a short period of time is provided. A correction value calculation section combines a signal, obtained by multiplying a first digital signal by an amplitude correction candidate value and rotating the phase of the first digital signal, with a signal obtained by multiplying a second digital signal by a multiplicative inverse of the amplitude correction candidate value and performing, for the second digital signal, phase rotation which is in a quadrature relationship to phase rotation performed for the first digital signal, so as to obtain a first combined signal, obtain an inflection point of the first combined signal, and input, to a demodulation section, the amplitude correction candidate value and a phase correction candidate value, which correspond to the inflection point, as an amplitude correction value and a phase correction value, respectively. The demodulation section makes compensation for the amplitudes and the phases and suppresses image interference, based on the amplitude correction value and the phase correction value.

25 Claims, 19 Drawing Sheets

U.S. PATENT DOCUMENTS

| | | | |
|---|---|---|---|
| 2005/0033539 A1* | 2/2005 | Ishizuka et al. | 702/94 |
| 2005/0070236 A1* | 3/2005 | Paulus | 455/135 |
| 2005/0148304 A1* | 7/2005 | Jerng | 455/75 |

FOREIGN PATENT DOCUMENTS

| | | |
|---|---|---|
| JP | 8-125447 | 5/1996 |
| JP | 8-130416 | 5/1996 |
| JP | 10-313261 | 11/1998 |
| JP | 11-234047 | 8/1999 |
| JP | 2000-174558 | 6/2000 |
| JP | 2000-209036 | 7/2000 |
| JP | 2001-257538 | 9/2001 |
| JP | 2003-142947 | 5/2003 |
| JP | 2003-309612 | 10/2003 |
| JP | 2004-72532 | 3/2004 |
| JP | 2002-24687 | 9/2004 |
| JP | 2004-266416 | 9/2004 |
| JP | 2005-31888 | 2/2005 |
| JP | 2005-244412 | 9/2005 |

* cited by examiner

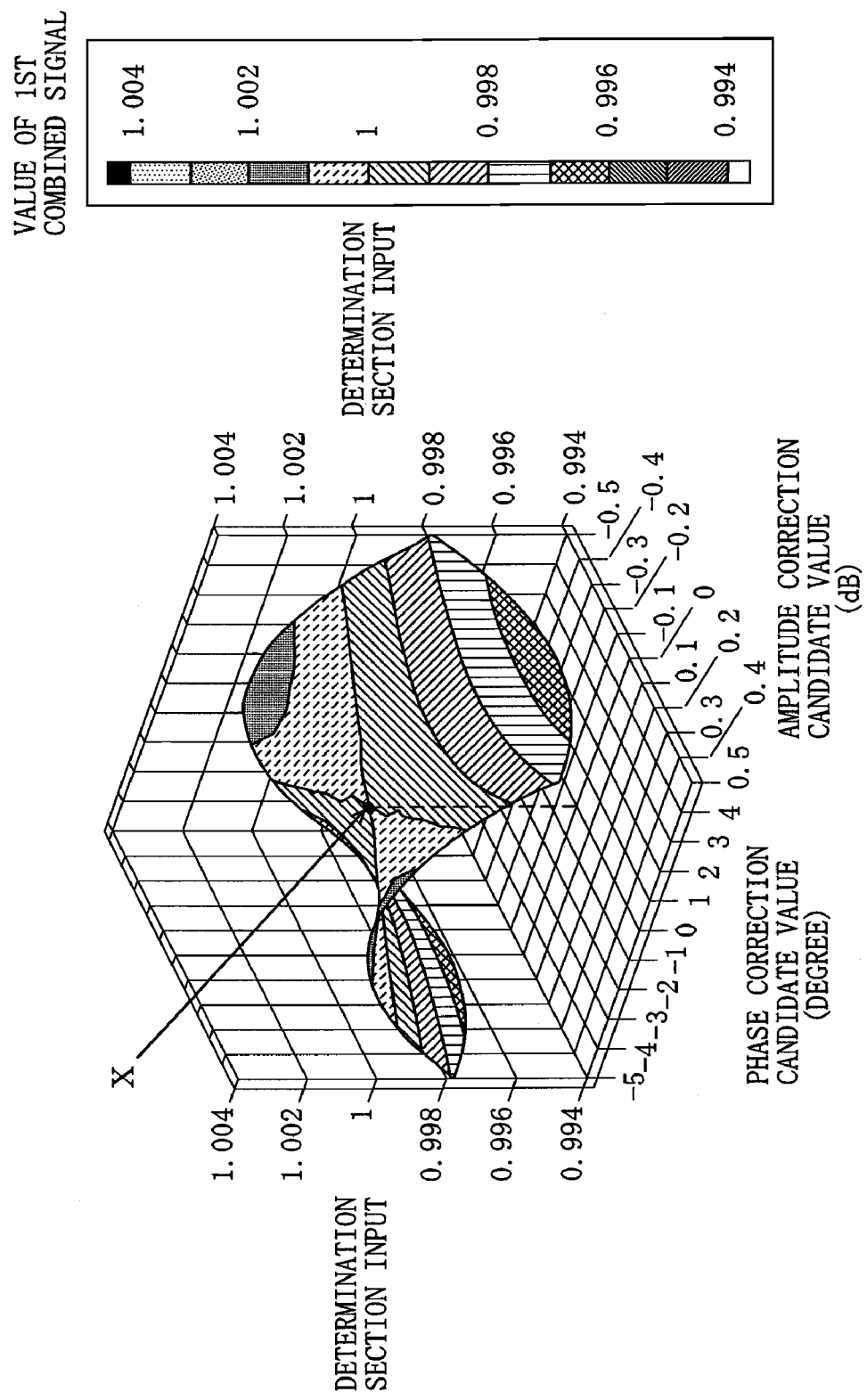

ENVELOPE STABILIZATION TIMING

RADIO RECEIVING APPARATUS

TECHNICAL FIELD

The present invention relates to a radio receiving apparatus used for a mobile terminal, and more particularly to a radio receiving apparatus capable of suppressing an image frequency signal.

BACKGROUND ART

In recent years, a mobile terminal is explosively widespread. A radio circuit thereof is required to be miniaturized. A radio receiving apparatus has two main types: one employing a homodyne (direct conversion) system and the other employing a heterodyne system. The heterodyne system is widely used for a mobile terminal, since the heterodyne system does not have problems of DC offset, 1/f noise, AM suppression, and the like, each of which is major interference in the homodyne system. On the other hand, the heterodyne system has a problem of interference caused by an image frequency signal.

FIG. 11 is a diagram showing a mechanism of interference caused by an image frequency signal. As shown in FIG. 11, the image frequency signal is present on the opposite side of a desired signal across a local oscillation signal LO. Therefore, when the image frequency signal and the desired signal are inputted to a mixer 900 and mixed with the local oscillation signal LO, the image frequency signal and the desired signal overlap each other in an intermediate frequency (IF) band. Accordingly, the image frequency signal interferes with demodulation of the desired signal. In order to reject the above-described image frequency signal, a steep RF filter may be simply provided so as to input only the desired signal to the mixer 900. However, the above-described RF filter increases in size, and therefore is inappropriate for a radio receiving apparatus which is required to be miniaturized.

In response thereto, a radio receiving apparatus employing the Hartley method is conventionally proposed for suppressing the above-described image frequency signal, using two local oscillation signals in phases 90 degrees different from each other. FIG. 12A is a block diagram showing a functional structure of the radio receiving apparatus employing the Hartley method. In FIG. 12A, the radio receiving apparatus includes a first mixer 901, a second mixer 902, a first phase shifter 903, and a second phase shifter 904.

The first phase shifter 903 rotates the phase of a local oscillation signal LO and divides the local oscillation signal LO into a local oscillation signal in the phase rotated by 0 degrees and a local oscillation signal in the phase rotated by 90 degrees, so as to input the respective local oscillation signals to the first mixer 901 and the second mixer 902. The first mixer 901 down-converts, by the local oscillation signal, an RF signal including a desired signal and an image frequency signal, so as to output the down-converted signals. FIG. 12B is a block diagram showing a phase relationship between the output signals from the first mixer 901 of FIG. 12A. As shown in FIG. 12B, when outputted from the first mixer 901, the desired signal and the image frequency signal are in phase.

The second mixer 902 down-converts the RF signal by the local oscillation signal in the phase rotated by 90 degrees, so as to output the down-converted signals. FIG. 12C is a block diagram showing a phase relationship between the output signals from the second mixer 902 of FIG. 12A. As shown in FIG. 12C, in the second mixer 902, the desired signal and the image frequency signal are in antiphase.

The second phase shifter 904 rotates the phases of the signals outputted from the first mixer 901 by 0 degrees and rotates the phases of the signals outputted from the second mixer 902 by minus 90 degrees, so as to combine the signals. FIG. 12D is a diagram showing phase relationships among the output signals from the second phase shifter 904 of FIG. 12A. As shown in FIG. 12D, the two image frequency signals have the same amplitude and are in antiphase, while the two desired signals have the same amplitude and are in phase. Thus, the image frequency signals are suppressed.

Ideally, the image frequency signals are rejected by the above-described image rejection of the Hartley method. In practice, however, the image frequency signals cannot be completely rejected, due to variations in elements used for the radio receiving apparatus. Therefore, a variety of radio receiving apparatuses are proposed for improving the amount of image suppression by making compensation for variations.

FIG. 13 is a block diagram showing a functional structure of a receiving circuit disclosed in Patent Document 1. In the receiving circuit disclosed in Patent Document 1, first, two streams of IF signals down-converted to an IF frequency by local oscillation signals in phases 90 degrees different from each other are generated. A circuit 906 extracts one of the IF signals so as to detect both the signals by the extracted signal. The circuit 906 detects a phase difference between the examined two signals, and adjusts a variable phase shifter 905 such that the phase difference is 90 degrees. As a result, compensation is made for phase variations, and thus it is possible to realize a receiving circuit capable of high image suppression.

FIG. 14 is a block diagram showing a functional structure of a receiving circuit disclosed in Patent Document 2. In the receiving circuit disclosed in Patent Document 2, two streams of IF signals down-converted to an IF frequency by local oscillation signals in phases 90 degrees different from each other are generated. The phase of one of the two streams of IF signals is rotated by another 90 degrees, so as to calculate the sum of and the difference between the two streams of IF signals. Further, the electric power of the difference signal is detected in a power detection circuit 907a and the electric power of the sum signal is detected in a power detection circuit 907b. The electric power of the difference signal and the electric power of the sum signal are compared to each other, so as to obtain the difference therebetween, and then a switch is flipped to the power detection circuit of the signal having the greater electric power. Then, a circuit 908 adjusts the gain of an IF amplifier so as to minimize the electric power of the power detection circuit to which the switch is flipped. As a result, compensation is made for the gain/loss of elements, i.e., amplitude variations, and thus it is possible to realize a receiving circuit capable of high image suppression.

FIG. 15 is a block diagram showing a functional structure of a receiving circuit disclosed in Patent Document 3, Patent Document 4, and Patent Document 5. In the receiving circuit shown in FIG. 15, two streams of IF signals down-converted to an IF frequency by local oscillation signals in phases 90 degrees different from each other are generated. Then, only when signals at an image frequency are stronger than signals at a desired frequency, a circuit 911 generates signals obtained by suppressing the signals at the desired frequency from a portion of the two IF signals. In other words, the circuit 911 generates signal components at the image frequency. Further, a circuit 910 adjusts the levels of the original two IF signals, and a circuit 909 subtracts the signal components at the image frequency therefrom. The levels are adjusted in attenuators ATT. An image interference canceller adjusts the amount of the attenuation so as to minimize a bit error rate (BER: Bit Error Rate) of demodulating the IF signals obtained after the subtraction. As a result, compensation is made for both phase variations and amplitude variations, and thus it is possible to realize a receiving circuit capable of high image suppression.

Patent Document 1: Japanese Laid-Open Patent Publication No. 8-125447

Patent Document 2: Japanese Laid-Open Patent Publication No. 8-130416

Patent Document 3: Japanese Laid-Open Patent Publication No. 2002-246847

Patent Document 4: Japanese Laid-Open Patent Publication No. 2003-309612

Patent Document 5: Japanese Laid-Open Patent Publication No. 2004-72532

SUMMARY OF THE INVENTION

Problems to be Solved by the Invention

However, the receiving circuit shown in FIG. 13 makes compensation for only the phase variations of elements. On the other hand, the receiving circuit shown in FIG. 14 makes compensation for only the amplitude variations of elements. In practice, however, both the amplitudes and the phases vary, and therefore compensation is required to be made for both.

Further, the receiving circuit shown in FIG. 15, in order to improve the bit error rate, causes a feedback loop to operate so as to suppress image interference. The bit error rate can be calculated only from known data. Therefore, for example, in a mobile phone, the bit error rate can only be obtained by calculating only several bits of training data included in each frame. However, in order to cause the feedback loop to operate until the image interference can be suppressed, a large number of frames are required to be received such that the bit error rate converges to a value smaller than a predetermined value. As described above, it requires a long time to suppress image interference, using the receiving circuit shown in FIG. 15.

Thus, objects of the present invention are to provide a radio receiving apparatus capable of making compensation for both amplitude variations and phase variations and of suppressing image interference in a short period of time.

Solution to the Problems

To achieve the above objects, the present invention has the following aspects. The present invention is directed to a radio receiving apparatus for frequency-converting a radio frequency signal into an intermediate frequency signal and demodulating the radio frequency signal, the radio receiving apparatus including: a frequency conversion section for converting the radio frequency signal into first and second intermediate frequency signals, based on two local oscillation signals in phases 90 degrees different from each other; a first analog-to-digital conversion section for converting the first intermediate frequency signal into a first digital signal; a second analog-to-digital conversion section for converting the second intermediate frequency signal into a second digital signal; a demodulation section for making corrections to amplitudes and phases of the first and second digital signals and for rejecting image frequency signals therefrom, so as to convert the obtained signals into signals of a baseband bandwidth; and a correction value calculation section for obtaining, by calculations, an amplitude correction value and a phase correction value which are used for making corrections to the amplitudes and the phases of the first and second digital signals in the demodulation section. The correction value calculation section combines a signal, obtained by multiplying the first digital signal by an amplitude correction candidate value and rotating the phase of the first digital signal, with a signal obtained by multiplying the second digital signal by a multiplicative inverse of the amplitude correction candidate value and performing, for the second digital signal, phase rotation which is in a quadrature relationship to phase rotation performed for the first digital signal, so as to obtain a first combined signal, obtain an inflection point of the first combined signal, and input, to the demodulation section, the amplitude correction candidate value and the phase correction candidate value, which correspond to the inflection point, as the amplitude correction value and the phase correction value, respectively.

According to the present invention, a radio receiving apparatus capable of making compensation for both amplitude variations and phase variations is provided, since the inflection point of the first combined signal can be set as the amplitude correction value and the phase correction value. Additionally, it is not required to wait for convergence in a feedback loop as in a conventional manner, since it is possible to obtain the amplitude correction value and the phase correction value by calculations. Thus, it is possible to suppress image interference in a short period of time.

It is preferable that the correction value calculation section may combine a signal, obtained by multiplying the first digital signal by the amplitude correction candidate value and counter-rotating the phase of the first digital signal by the phase correction candidate value, with a signal obtained by multiplying the second digital signal by the multiplicative inverse of the amplitude correction candidate value and rotating the phase of the second digital signal by 90 degrees and by the phase correction candidate value, so as to obtain the first combined signal.

Thus, it is possible to obtain the first combined signal mainly including image signals.

It is preferable that the correction value calculation section may obtain the inflection point by two-dimensional matrix calculations.

Thus, it is possible to obtain, using two-dimensional matrix calculations, the first combined signal all together within a predetermined range of the amplitude correction candidate value and a predetermined range of the phase correction candidate value, and obtain the inflection point in a short period of time.

As an embodiment, the correction value calculation section may fix the phase correction candidate value as 0 degrees in order to obtain, by one-dimensional matrix calculations, an amplitude correction candidate value for minimizing a level of the first combined signal, and may fix the amplitude correction candidate value as the obtained amplitude correction candidate value in order to obtain, by one-dimensional matrix calculations, a phase correction candidate value for maximizing the level of the first combined signal, so as to set the obtained amplitude correction candidate value and the obtained phase correction candidate value as the amplitude correction value and the phase correction value, respectively.

Thus, it is possible to obtain the inflection point even when the radio receiving apparatus does not have a processing capability to perform two-dimensional matrix calculations.

As an embodiment, the correction value calculation section may fix the amplitude correction candidate value as 0 dB in order to obtain, by one-dimensional matrix calculations, a phase correction candidate value for maximizing a level of the first combined signal, and may fix the phase correction candidate value as the obtained phase correction candidate value in order to obtain, by one-dimensional matrix calculations, an amplitude correction candidate value for minimizing the level of the first combined signal, so as to set the obtained phase correction candidate value and the obtained amplitude correction candidate value as the phase correction value and the amplitude correction value, respectively.

Thus, it is possible to obtain the inflection point even when the radio receiving apparatus does not have a processing capability to perform two-dimensional matrix calculations.

As an embodiment, the correction value calculation section may fix the phase correction candidate value as 0 degrees in order to obtain, by sequential calculations, an amplitude correction candidate value for minimizing a level of the first combined signal, and may fix the amplitude correction candidate value as the obtained amplitude correction candidate value in order to obtain, by sequential calculations, a phase correction candidate value for maximizing the level of the first combined signal, so as to set the obtained amplitude correction candidate value and the obtained phase correction candidate value as the amplitude correction value and the phase correction value, respectively.

Thus, it is possible to obtain the inflection point even when the radio receiving apparatus does not have a processing capability to perform two-dimensional matrix calculations.

As an embodiment, the correction value calculation section may fix the amplitude correction candidate value as 0 dB in order to obtain, by sequential calculations, a phase correction candidate value for maximizing a level of the first combined signal, and may fix the phase correction candidate value as the obtained phase correction candidate value in order to obtain, by sequential calculations, an amplitude correction candidate value for minimizing the level of the first combined signal, so as to set the obtained phase correction candidate value and the obtained amplitude correction candidate value as the phase correction value and the amplitude correction value, respectively.

Thus, it is possible to obtain the inflection point even when the radio receiving apparatus does not have a processing capability to perform two-dimensional matrix calculations.

It is preferable that the demodulation section may reject the image frequency signals by the Hartley method.

Thus, it is possible to reject the image frequency signals with a simple structure.

For example, the demodulation section may combine a signal, obtained by multiplying the first digital signal by the amplitude correction value and rotating the phase of the first digital signal by the phase correction value, with a signal obtained by multiplying the second digital signal by a multiplicative inverse of the amplitude correction value, rotating the phase of the second digital signal by minus 90 degrees, and counter-rotating the phase of the second digital signal by the phase correction value, so as to obtain a second combined signal and convert the second combined signal into a signal of the baseband bandwidth.

Thus, it is possible to obtain, as the second combined signal, a signal from which the image frequency signals are suppressed.

It is preferable that a comparison section for comparing a level of the first combined signal obtained in the correction value calculation section, to a level of the second combined signal obtained in the demodulation section, and for causing the demodulation section to make corrections only when the level of the first combined signal is more than a predetermined value greater than the level of the second combined signal, may be further included.

Thus, it is possible to reduce processing load of the radio receiving apparatus and consequently expect reduction of power consumption, since it is possible to proceed to a correction stage only when it is required to make corrections to the amplitudes and the phases.

It is preferable that the demodulation section may reject the image frequency signals by the Weaver method.

Thus, it is possible to reject the image frequency signals with a simple structure.

For example, the demodulation section: may multiply a signal, obtained by multiplying the first digital signal by the amplitude correction value, by a signal obtained by rotating a phase of a clock signal by the phase correction value, so as to obtain a first signal; may multiply a signal, obtained by multiplying the second digital signal by a multiplicative inverse of the amplitude correction value, by a signal obtained by rotating the phase of the clock signal by 90 degrees and by the phase correction value, so as to obtain a second signal; may multiply a signal, obtained by multiplying the first digital signal by the amplitude correction value, by a signal obtained by rotating the phase of the clock signal by minus 90 degrees and counter-rotating the phase of the clock signal by the phase correction value, so as to obtain a third signal; may multiply a signal, obtained by multiplying the second digital signal by the multiplicative inverse of the amplitude correction value, by a signal obtained by rotating the phase of the clock signal by the phase correction value, so as to obtain a fourth signal; may set a combined signal of the first signal and the second signal as an in-phase component; and may set a combined signal of the third signal and the fourth signal as a quadrature component.

Thus, it is possible to obtain the in-phase component and the quadrature component from which the image frequency signals are suppressed.

It is preferable that a comparison section for comparing a level of the first combined signal obtained in the correction value calculation section, to sizes of vectors of the in-phase component and the quadrature component which are obtained in the demodulation section, and for causing the demodulation section to make corrections only when the level of the first combined signal is more than a predetermined value greater than the sizes of the vectors, may be further included.

Thus, it is possible to reduce processing load of the radio receiving apparatus and consequently expect reduction of power consumption, since it is possible to proceed to a correction stage only when it is required to make corrections to the amplitudes and the phases.

For example, the correction value calculation section may continuously perform calculations for corrections.

Thus, it is possible to improve a reception quality, since corrections are constantly made to the amplitudes and the phases.

For example, the correction value calculation section may perform calculations for corrections only in a first portion of a data frame of the radio frequency signal.

Thus, power consumption can be smaller than that required in the case of continuously performing calculations for corrections.

For example, the correction value calculation section may perform calculations for corrections only when receiving a training signal of a data frame of the radio frequency signal.

Thus, power consumption can be smaller than that required in the case of continuously performing calculations for corrections.

It is preferable that the correction value calculation section may perform calculations for corrections when power is turned on, so as to obtain the amplitude correction value and the phase correction value in advance, and the demodulation section may make corrections based on the amplitude correction value and the phase correction value which are obtained in advance.

Thus, it is not required to make corrections while receiving a radio frequency signal. Consequently, it is possible to expect reduction of power consumption.

As an embodiment, the correction value calculation section may perform calculations for corrections based on a radio frequency signal outputted from a transmission circuit when power is turned on, so as to obtain the amplitude correction value and the phase correction value in advance.

Thus, it is possible to obtain the amplitude correction value and the phase correction value, using a pseudo radio frequency signal. It is possible to obtain generally appropriate amplitude correction value and phase correction value, since elements of the transmission path at the receiving end, through which the pseudo radio frequency signal passes, are similar to those used for receiving an actual radio frequency signal.

It is preferable that when having received a radio frequency signal corresponding to a frequency different from a frequency of the radio frequency signal outputted from the transmission circuit, the correction value calculation section may newly perform calculations for corrections based on the received radio frequency signal.

Thus, it is possible to respond to even a case where changes of the amplitude correction value and the phase correction value are required.

As an embodiment, the radio receiving apparatus may obtain the intermediate frequency signals by a Low-IF method, and the correction value calculation section may perform symbol synchronization of the image frequency signals corresponding to adjacent channels, so as to obtain the inflection point at timing for stabilizing an envelope of a reproduced symbol.

Thus, it is possible to obtain the amplitude correction value and the phase correction value each having a small error.

It is preferable that the demodulation section may make corrections to an amplitude and a phase of each frequency component of the digital-Fourier-transformed first and second digital signals, may reject an image frequency signal therefrom, may inverse-digital-Fourier-transform each frequency component obtained after the corrections and the image frequency rejection, and may down-convert a signal, obtained by the inverse digital Fourier transform, to the baseband bandwidth, and the correction value calculation section may combine a signal, obtained by multiplying each frequency component of the digital-Fourier-transformed first digital signal by the amplitude correction candidate value and rotating the phase of each frequency component of the digital-Fourier-transformed first digital signal, with a signal obtained by multiplying each frequency component of the digital-Fourier-transformed second digital signal by the multiplicative inverse of the amplitude correction candidate value and performing, for each frequency component of the digital-Fourier-transformed second digital signal, rotation which is in a quadrature relationship to rotation performed for each frequency component of the first digital signal, in order to obtain the first combined signal, and may obtain the inflection point of each frequency component of the first combined signal, in order to input, to the demodulation section, the amplitude correction candidate value and the phase correction candidate value, which correspond to the inflection point, as the amplitude correction value and the phase correction value, respectively, which correspond to each frequency component, so as to cause the demodulation section to make corrections to the amplitudes and the phases of the first and second digital signals.

Thus, it is possible to suppress the image frequency signals by making corrections to the amplitudes and the phases even in a broadband radio frequency signal. Note that in this case, the first combined signal is a signal from which the image frequency signal is suppressed with respect to each frequency component.

For example, the first analog-to-digital conversion section may include: a first antialiasing filter for preventing a frequency causing aliasing from passing therethrough, so as to allow the first intermediate frequency signal to pass therethrough; a first analog-to-digital converter for converting output from the first antialiasing filter into a digital signal; and a first channel selection filter for selecting a desired channel from output from the first analog-to-digital converter, so as to output the selected desired channel as the first digital signal, and the second analog-to-digital conversion section may include: a second antialiasing filter for preventing a frequency causing aliasing from passing therethrough, so as to allow the second intermediate frequency signal to pass therethrough; a second analog-to-digital converter for converting output from the second antialiasing filter into a digital signal; and a second channel selection filter for selecting a desired channel from output from the second analog-to-digital converter, so as to output the selected desired channel as the second digital signal.

Thus, it is possible to select the desired channel while suppressing aliasing, and therefore the present invention can be applied to a multimode and/or multiband mobile terminal and the like.

For example, the first analog-to-digital conversion section may include: a first channel selection filter for selecting a desired channel from the first intermediate frequency signal, so as to allow the selected desired channel to pass therethrough; and a first analog-to-digital converter for converting output from the first channel selection filter into a digital signal, and the second analog-to-digital conversion section may include: a second channel selection filter for selecting a desired channel from the second intermediate frequency signal, so as to allow the selected desired channel to pass therethrough; and a second analog-to-digital converter for converting output from the second channel selection filter into a digital signal.

Thus, it is possible to select the desired channel, and therefore the present invention can be applied to a multimode and/or multiband mobile terminal and the like.

Further, the present invention may have the following aspects. The present invention is directed to a radio receiving apparatus for frequency-converting a radio frequency signal into an intermediate frequency signal and demodulating the radio frequency signal, the radio receiving apparatus including: a frequency conversion section for converting the radio frequency signal into first and second intermediate frequency signals, based on two local oscillation signals in phases 90 degrees different from each other; a first analog-to-digital conversion section for converting the first intermediate frequency signal into a first digital signal; a second analog-to-digital conversion section for converting the second intermediate frequency signal into a second digital signal; a correction value calculation section for obtaining, by calculations, an amplitude correction value and a phase correction value which are used for making corrections to amplitudes and phases of the first and second digital signals, for making corrections to the amplitudes and the phases of the first and second digital signals, using the amplitude correction value and the phase correction value, and for rejecting image frequency signals therefrom; and a demodulation section for converting signals obtained by rejecting the image frequency signals into signals of a baseband bandwidth. The correction value calculation section combines a signal, obtained by multiplying the first digital signal by an amplitude correction candidate value and rotating the phase of the first digital signal, with a signal obtained by multiplying the second digital signal by a multiplicative inverse of the amplitude correction candidate value and performing, for the second digital signal, phase rotation which is in a quadrature relationship to phase rotation performed for the first digital signal, so as to obtain a first combined signal, obtain an inflection point of the first combined signal, and set the amplitude correction candidate value and the phase correction candidate value, which correspond to the inflection point, as the amplitude correction value and the phase correction value, respectively.

It is preferable that in order to make corrections to the amplitudes and the phases of the first and second digital signals, the correction value calculation section may combine a signal, obtained by multiplying the first digital signal by the amplitude correction value and rotating the phase of the first digital signal by 90 degrees and by the phase correction value, with a signal obtained by multiplying the second digital signal by the multiplicative inverse of the amplitude correction value and counter-rotating the phase of the second digital signal by the phase correction value, so as to obtain a second combined signal. The demodulation section may convert the second combined signal into a signal of the baseband bandwidth.

Thus, it is possible to reduce the circuit size, since the correction value calculation section calculates the amplitude correction value and the phase correction value so as to make corrections to the first and second digital signals based on the amplitude correction value and the phase correction value.

Effect of the Invention

As described above, according to the present invention, a radio receiving apparatus capable of making compensation for both amplitude variations and phase variations is provided. Additionally, a radio receiving apparatus capable of suppressing image interference in a short period of time is provided.

BRIEF DESCRIPTION OF THE DRAWINGS

FIG. 2A is a 3D contour diagram showing a case where a value of a first combined signal is obtained when an amplitude correction candidate value Ac and a phase correction candidate value αc/2 are changed on the assumption that neither an amplitude error nor a phase error are present (i.e., on the assumption that B=0 dB and θ=0 degrees).

Figure 1A:
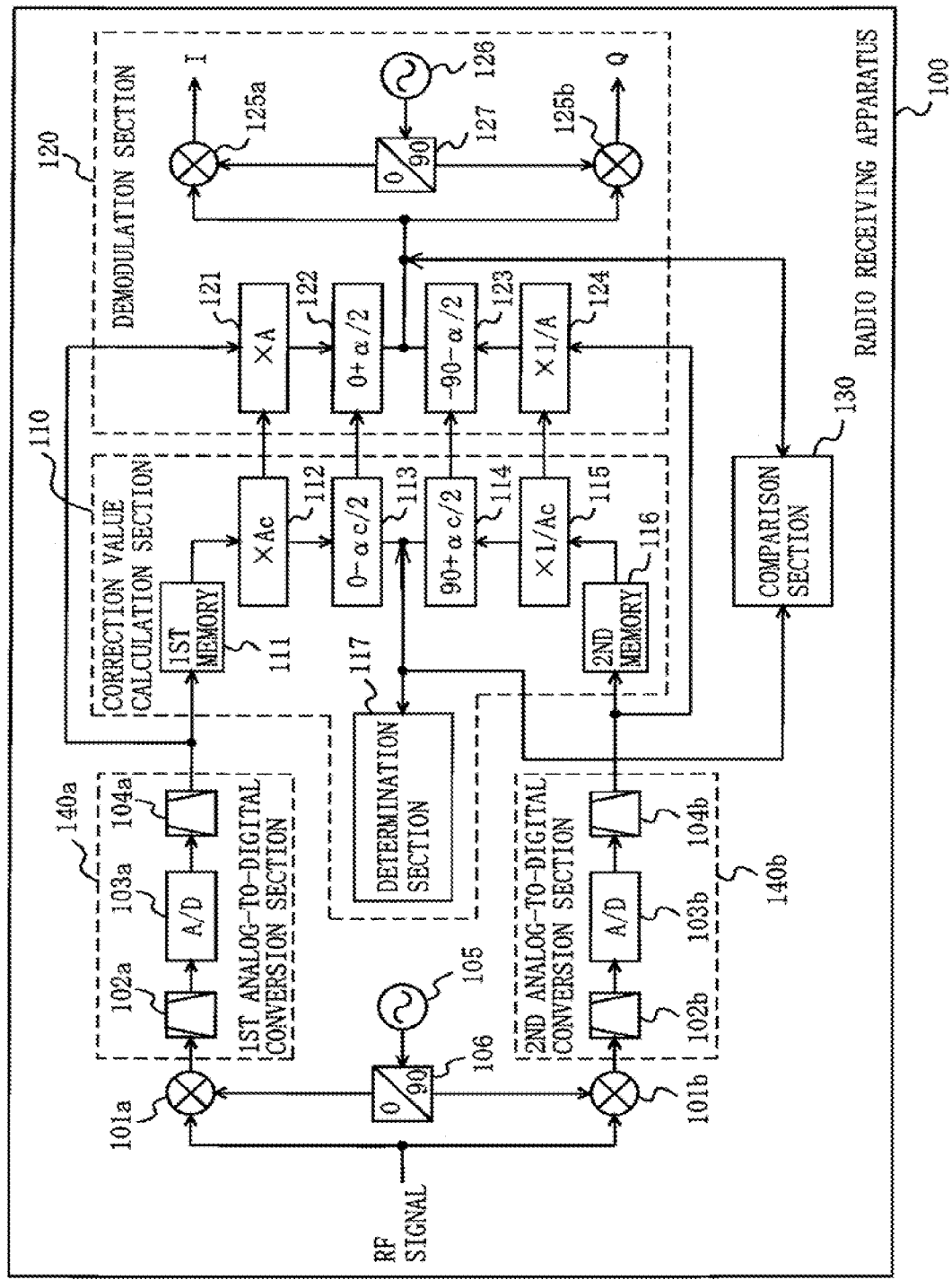
FIG. 1A is a block diagram showing a functional structure of a radio receiving apparatus 100 according to a first embodiment of the present invention.

DESCRIPTION OF THE REFERENCE CHARACTERS 100, 200, 300, 400, 500 radio receiving apparatus
101a first down-converter
101b second down-converter
102a first antialiasing filter
103a first analog-to-digital converter
104a first channel selection filter
102b second antialiasing filter
103b second analog-to-digital converter
104b second channel selection filter
105 local oscillator
106 first 90-degree phase shifter
110, 210, 510 correction value calculation section
120, 220, 320, 520 demodulation section
130, 230, 330, 530 comparison section
140a first analog-to-digital conversion section
140b second analog-to-digital conversion section
111, 116, 511 memory 112, 212, 512 first multiplication section
113, 213, 513 first phase shift section
114, 214, 514 second phase shift section
115, 215, 515 second multiplication section
117, 217 determination section
121, 221, 321 third multiplication section
122, 222, 322 third phase shift section
123, 223, 323 fourth phase shift section
324 fifth phase shift section
325 sixth phase shift section
124, 224, 326 fourth multiplication section
125a, 327 third down-converter
125b, 328 fourth down-converter
329 fifth down-converter
332 sixth down-converter
126, 331 clock generation section
127 second 90-degree phase shifter
129 DPDT
130 SPDT
211 first digital Fourier transform section
216 second digital Fourier transform section
225 inverse digital Fourier transform section
401 amplifier at receiving end
402 first switch circuit
403 amplifier at transmitting end
404 second switch circuit
405 transmission circuit
410 third memory

DETAILED DESCRIPTION OF THE INVENTION

First Embodiment

FIG. 1A is a block diagram showing a functional structure of a radio receiving apparatus 100 according to a first embodiment of the present invention. In FIG. 1A, the radio receiving apparatus 100 includes a first down-converter 101a, a first analog-to-digital conversion section 140a, a second down-converter 101b, a second analog-to-digital conversion section 140b, a local oscillator 105, a first 90-degree phase shifter 106, a correction value calculation section 110, a demodulation section 120, and a comparison section 130.

The first analog-to-digital conversion section 140a includes a first antialiasing filter 102a, a first analog-to-digital converter 103a, and a first channel selection filter 104a.

The second analog-to-digital conversion section 140b includes a second antialiasing filter 102b, a second analog-to-digital converter 103b, and a second channel selection filter 104b.

The correction value calculation section 110 includes a first memory 111, a first multiplication section 112, a first phase shift section 113, a second phase shift section 114, a second multiplication section 115, a second memory 116, and a determination section 117.

The demodulation section 120 includes a third multiplication section 121, a third phase shift section 122, a fourth phase shift section 123, a fourth multiplication section 124, a third down-converter 125a, a fourth down-converter 125b, a clock generation section 126, and a second 90-degree phase shifter 127.

A radio frequency signal (hereinafter referred to as an RF signal) received by an antenna is divided into two signals so as to be inputted to the first down-converter 101a and the second down-converter 101b, respectively. (Equation 1) shows $V_{RF}$, which is an example of the RF signal. In (Equation 1), $V_{IF}$ represents the amplitude of a desired signal. VIM represents the amplitude of an image frequency signal (hereinafter referred to as an image signal). $\omega_{LO}-\omega_{IF}$ represents the phase of the desired signal. $\omega_{LO}+\omega_{IF}$ represents the phase of the image signal. In other words, $\omega_{LO}$ represents the angular frequency of a local oscillation signal and $\omega_{IF}$ represents the angular frequency of the down-converted image signal. As shown in (Equation 1), the RF RF signal (Equation 1)

$$V_{RF} = V_{IF} \cdot \cos\{(\omega_{LO} - \omega_{IF}) \cdot t\} \leftarrow \text{Desired signal} +$$
$$V_{IM} \cdot \cos\{(\omega_{LO} + \omega_{IF}) \cdot t\} \leftarrow \text{Image signal}$$

signal includes the desired signal and the image signal.

The local oscillator 105 outputs the local oscillation signal. The first 90-degree phase shifter 106 inputs the local oscillation signal outputted from the local oscillator 105 to the first down-converter 101a by rotating the phase of the local oscillation signal by 0 degrees, and to the second down-converter 101b by rotating the phase of the local oscillation signal by 90 degrees. The first down-converter 101a down-converts the RF signal by the local oscillation signal outputted from the first 90-degree phase shifter 106, so as to output the down-converted signal as a first intermediate frequency signal (hereinafter referred to as a first IF signal). (Equation 2) shows a first IF signal $V_{IF\_I}$ obtained when the RF signal is $V_{RF}$ shown in (Equation 1). In (Equation 2), (1/B)·G represents the gain of the path. Herein, G represents an average gain and B represents an amplitude error. $\cos(\omega_{LO} \cdot t - \theta/2)$ represents the local oscillation signal in the phase rotated by 0 degrees. Herein, θ represents a phase error. As shown in (Equation 2), the first IF signal includes the desired signal and the image signal.

First IF signal (Equation 2)

$$V_{IF\_I} = (1/B) \cdot G \begin{bmatrix} V_{RF} \cdot \cos\{(\omega_{LO} - \omega_{IF}) \cdot t\} + \\ V_{IM} \cdot \cos\{(\omega_{LO} + \omega_{IF}) \cdot t\} \end{bmatrix} \cdot$$
$$\cos(\omega_{LO} \cdot t - \theta/2)$$
$$\cong (1/B) \cdot G \cdot \left\{ \begin{array}{c} \underbrace{V_{RF} \cdot \cos(-\omega_{IF} \cdot t + \theta/2)}_{\text{Desired signal}} + \\ \underbrace{V_{IM} \cdot \cos(\omega_{IF} \cdot t + \theta/2)}_{\text{Image signal}} \end{array} \right\}$$

The second down-converter 101b down-converts the RF signal by the local oscillation signal which is in the phase rotated by 90 degrees and is outputted from the first 90-degree phase shifter 106, so as to output the down-converted signal as a second intermediate frequency signal (hereinafter referred to as a second IF signal). (Equation 3) shows a second IF signal $V_{IF\_Q}$ obtained when the RF signal is $V_{RF}$ shown in (Equation 1). In (Equation 3), B·G represents the gain of the path. Herein, G represents the average gain and B represents the amplitude error. $\cos(\omega_{LO} \cdot t + 90 + \theta/2)$ represents the local oscillation signal in the phase rotated by 90 degrees. Herein, θ represents the phase error. As shown in (Equation 3), the second IF signal includes the desired signal and the image signal.

Second IF signal (Equation 3)

$$V_{IF\_Q} = B \cdot G \begin{bmatrix} V_{RF} \cdot \cos\{(\omega_{LO} - \omega_{IF}) \cdot t\} + \\ V_{IM} \cdot \cos\{(\omega_{LO} + \omega_{IF}) \cdot t\} \end{bmatrix} \cdot$$
$$\cos(\omega_{LO} \cdot t + 90 + \theta/2)$$
$$\cong B \cdot G \left\{ \begin{array}{c} \underbrace{V_{RF} \cdot \cos(-\omega_{IF} \cdot t - 90 - \theta/2)}_{\text{Desired signal}} + \\ \underbrace{V_{IM} \cdot \cos(\omega_{IF} \cdot t - 90 - \theta/2)}_{\text{Image signal}} \end{array} \right\}$$

Thus, the local oscillator 105, the first 90-degree phase shifter 106, the first down-converter 101a, and the second down-converter 101b function as a frequency conversion section for converting the RF signal into the first and second IF signals based on the two local oscillation signals in phases 90 degrees different from each other.

The first antialiasing filter 102a prevents a frequency causing aliasing from passing therethrough, so as to allow the first IF signal to pass therethrough. The first analog-to-digital converter 103a converts the output from the first antialiasing filter 102a into a digital signal. The first channel selection filter 104a selects a desired channel from the output from the first analog-to-digital converter 103a, so as to output the desired channel as a first digital signal. The first digital signal is inputted to the correction value calculation section 110 and the demodulation section 120.

The second antialiasing filter 102b prevents a frequency causing aliasing from passing therethrough, so as to allow the second IF signal to pass therethrough. The second analog-to-digital converter 103b converts the output from the second antialiasing filter 102b into a digital signal. The second channel selection filter 104b selects a desired channel from the output from the second analog-to-digital converter 103b, so as to output the desired channel as a second digital signal. The second digital signal is inputted to the correction value calculation section 110 and the demodulation section 120.

The correction value calculation section 110 obtains, by calculations, a correction value (hereinafter referred to as an amplitude correction value) of the amplitude and a correction value (hereinafter referred to as a phase correction value) of the phase, based on the first and second digital signals. The correction value calculation section 110 inputs the obtained amplitude correction value and phase correction value to the demodulation section 120.

The demodulation section 120 makes corrections to the first and second digital signals based on the amplitude correction value and the phase correction value which are outputted from the correction value calculation section 110, and generates an in-phase component (I) and a quadrature component (Q), so as to demodulate the RF signal.

The correction value calculation section 110 and the demodulation section 120 may be realized in a hardware manner by an integrated circuit, or may be realized in a software manner by causing a general-purpose CPU to read a program capable of causing the general-purpose CPU to execute the below-described operation.

First, the functions of the correction value calculation section 110 will be described. The correction value calculation section 110 stores, in the first memory 111 and the second memory 116, respectively, the first and second digital signals each having several cycles sufficient to determine the amplitude and the phase of each of the IF signals. As for several cycles sufficient to determine the amplitude and the phase of an IF signal, only one cycle is, in theory, sufficient to make the determination. However, it requires several cycles to several tens of cycles to remove effects of noise. In contrast, it requires $10^6$ symbols to determine a BER, e.g., the BER of $10^{-6}$, as in a conventional manner. If a cycle of one symbol is equal to a hundred cycles of the IF signal, it requires $10^9$ cycles to determine the BER. Thus, the number of cycles of the IF signal required for determining the amplitude and the phase thereof in the present invention is overwhelmingly smaller than that required for determining the BER. In the first multiplication section 112, the correction value calculation section 110 multiplies the first digital signal stored in the first memory 111 by an amplitude correction candidate value Ac which is a candidate for the amplitude correction value. In the first phase shift section 113, the correction value calculation section 110 counter-rotates the phase of the multiplication result obtained in the first multiplication section 112 by a phase correction candidate value $\alpha c/2$ degrees which is a candidate for the phase correction value. That is, the first phase shift section 113 rotates the phase of the multiplication result obtained in the first multiplication section 112 by $(0-\alpha c/2)$ degrees.

In the second multiplication section 115, the correction value calculation section 110 multiplies the second digital signal stored in the second memory 116, by 1/Ac which is the multiplicative inverse of the amplitude correction candidate value Ac. The correction value calculation section 110 rotates the phase of the multiplication result obtained in the second multiplication section 115 by 90 degrees and by the phase correction candidate value $\alpha c/2$ degrees. That is, the second phase shift section 114 rotates the phase of the multiplication result obtained in the second multiplication section 115 by $(90+\alpha c/2)$ degrees. Accordingly, the angle of the phase rotation performed in the first phase shift section 113 and the angle of the phase rotation performed in the second phase shift section 114 are in a quadrature phase relationship (a quadrature relationship).

The correction value calculation section 110 combines the first digital signal obtained in the first phase shift section 113, with the second digital signal obtained in the second phase shift section 114, so as to input the combined signal as a first combined signal to the determination section 117. (Equation 4) shows a first combined signal $V_{IF\_M}$ to be inputted to the determination section 117 when (Equation 2) and (Equation 3) are used as the first and second IF signals, respectively. As shown in (Equation 4), the combined signal includes almost only the down-converted image signals.

First combined signal (Equation 4)

$$V_{IF\_M} \cong G \cdot A_C \cdot (1/B) \cdot V_{IM} \cdot \cos(\omega_{IF} \cdot t + \theta/2 - \alpha c/2) + G \cdot (1/Ac) \cdot B \cdot V_{IM} \cdot \cos(\omega_{IF} \cdot t - \theta/2 + \alpha c/2)$$

In the correction value calculation section 110, calculations performed by the first multiplication section 112, calculations performed by the first phase shift section 113, calculations performed by the second multiplication section 115, calculations performed by the second phase shift section 114, and combination calculations are performed all together within a certain range of the amplitude correction candidate value Ac and a certain range of the phase correction candidate value $\alpha c/2$, by two-dimensional matrix calculations.

The determination section 117 obtains an inflection point of the first combined signal obtained when the amplitude correction candidate value Ac and the phase correction candidate value $\alpha c/2$ are variables. The determination section 117 inputs, to the demodulation section 120, the amplitude correction candidate value Ac and the phase correction candidate value $\alpha c/2$, which correspond to the inflection point, as an amplitude correction value A and a phase correction value $\alpha/2$, respectively.

Next, the functions of the demodulation section 120 will be described. In the third multiplication section 121, the demodulation section 120 multiplies the first digital signal by the amplitude correction value A. In the third phase shift section 122, the demodulation section 120 rotates the phase of the multiplication result obtained in the third multiplication section 121 by the phase correction value $\alpha/2$ degrees. That is, the third phase shift section 122 rotates the phase of the multiplication result obtained in the third multiplication section 121 by (0+α/2) degrees.

In the fourth multiplication section 124, the demodulation section 120 multiplies the second digital signal by 1/A which is the multiplicative inverse of the amplitude correction value A. The demodulation section 120 counter-rotates the phase of the multiplication result obtained in the fourth multiplication section 124 by 90 degrees and by the phase correction value α/2 degrees. That is, the fourth phase shift section 123 rotates the phase of the multiplication result obtained in the fourth multiplication section 124 by (−90−α/2) degrees.

The demodulation section 120 combines the first digital signal obtained in the third phase shift section 122, with the second digital signal obtained in the fourth phase shift section 123, so as to obtain a second combined signal. (Equation 5) shows a second combined signal VIF obtained in the demodulation section 120 when (Equation 2) and (Equation 3) are used as the first and second IF signals, respectively. As shown in (Equation 5), when A/B=B/A and ?=a, it is possible to obtain the second combined signal from which the image signals are suppressed, Second combined signal (Equation 5)

$$V_{IF} \cong G \cdot A \cdot (1/B) \cdot V_{RF} \cdot \cos(\omega_{IF} \cdot t + \theta/2 - \alpha/2) +$$
$$G \cdot (1/A) \cdot B \cdot \cos(\omega_{IF} \cdot t - \theta/2 + \alpha/2) +$$
$$G \cdot A \cdot (1/B) \cdot V_{IM} \cdot \cos(\omega_{IF} \cdot t + \theta/2 - \alpha/2) -$$
$$G \cdot (1/A) \cdot B \cdot V_{IM} \cdot \cos(\omega_{IF} \cdot t - \theta/2 + \alpha/2)$$

since B is the amplitude error and ? is the phase error. It will become more apparent from the following description that the above-described A and a are Ac and ac, respectively, which correspond to an inflection point of the second combined signal $V_{IF}$ shown in (Equation 5).

The second combined signal is inputted to the third down-converter 125a and the fourth down-converter 125b. Based on a clock signal generated by the clock generation section 126, the second 90-degree phase shifter 127 outputs the clock signal in the phase rotated by 0 degrees and the clock signal in the phase rotated by 90 degrees. Based on the clock signal in the phase rotated by 0 degrees, the third down-converter 125a down-converts the second combined signal to the baseband bandwidth, so as to output the down-converted signal as an in-phase component (I). Based on the clock signal in the phase rotated by 90 degrees, the fourth down-converter 125b down-converts the second combined signal to the baseband bandwidth, so as to output the down-converted signal as a quadrature component (Q). Thus, the demodulation section 120 makes amplitude compensation and phase compensation, and simultaneously rejects the image signals by the Hartley method.

Next, the operation of the correction value calculation section 110 and the demodulation section 120 will be described. First, at the initiation of the operation, the correction value calculation section 110 sets the amplitude correction candidate value Ac as 0 dB and the phase correction candidate value αc/2 as 0 degrees and only performs a 90-degree phase shift in the second phase shift section 114, so as to obtain the first combined signal. On the other hand, the demodulation section 120 sets the amplitude correction value A as 0 dB and the phase correction value α/2 as 0 degrees and only performs a minus 90-degree phase shift in the fourth phase shift section 123, so as to obtain the second combined signal.

Next, the correction value calculation section 110 and the demodulation section 120 input the first and second combined signals to the comparison section 130, respectively. The comparison section 130 compares the levels of the first and second combined signals to each other. Image interference becomes a problem when the image signals are far larger than the desired signals. When the image signals are not completely suppressed, the second combined signal is a signal into which the desired signals and the image signals are combined. In order to identify the above-described state, the comparison section 130 compares the levels of the first and second combined signals to each other. When the level of the first combined signal is more than a predetermined level (e.g., 10 dB to 30 dB) greater than the level of the second combined signal, the comparison section 130 determines that the operation is to proceed to a correction stage for the demodulation section 120 to make corrections, and gives instructions to the correction value calculation section 110 and the demodulation section 120. On the other hand, when the level of the first combined signal is not more than the predetermined level greater than the level of the second combined signal, the comparison section 130 gives the demodulation section 120 an instruction to demodulate the second combined signal by the amplitude correction value A=0 dB and the phase correction value α/2=0 degrees. Note that in FIG. 1A, arrows for indicating the respective instruction paths are not shown. Note that the comparison section 130 may be realized in a hardware manner by an integrated circuit, or may be realized in a software manner by a program capable of causing a CPU to execute the above-described operation.

Next, the operation of the correction value calculation section 110 and the demodulation section 120 in the case of proceeding to the correction stage will be described. At the correction stage, by two-dimensional matrix calculations, the correction value calculation section 110 obtains, all together or several times divided, values of the first combined signal obtained when the amplitude correction candidate value Ac and the phase correction candidate value αc/2 are discretely changed within a predetermined range (e.g., −0.5 dB≦10 log₁₀|Ac|≦0.5 dB, −5 degree≦ac/25 degrees). Then, in accordance with the obtained values of the first combined signal, the correction value calculation section 110 obtains an inflection point of the first combined signal obtained when the amplitude correction candidate value Ac and the phase correction candidate value αc/2 are variables. The correction value calculation section 110 inputs, to the demodulation section 120, the amplitude correction candidate value Ac and the phase correction candidate value αc/2, which correspond to the inflection point, as the amplitude correction value A and the phase correction value α/2, respectively. Thereafter, the demodulation section 120 makes corrections to the amplitudes and the phases, using the received amplitude correction value A and phase correction value α/2, so as to obtain the second combined signal. The demodulation section 120 down-converts the second combined signal to the baseband bandwidth, so as to obtain the in-phase component (I) and the quadrature component (Q).

The correction value calculation section 110, the demodulation section 120, and the comparison section 130 may be realized as an integrated circuit, may be realized as separate integrated circuits, respectively, or may be realized as integrated circuits partially overlapping each other. Further, when realized in a software manner, the correction value calculation section 110, the demodulation section 120, and the comparison section 130 may use a common CPU, or may use separate CPUs, respectively.

Figure 1B:
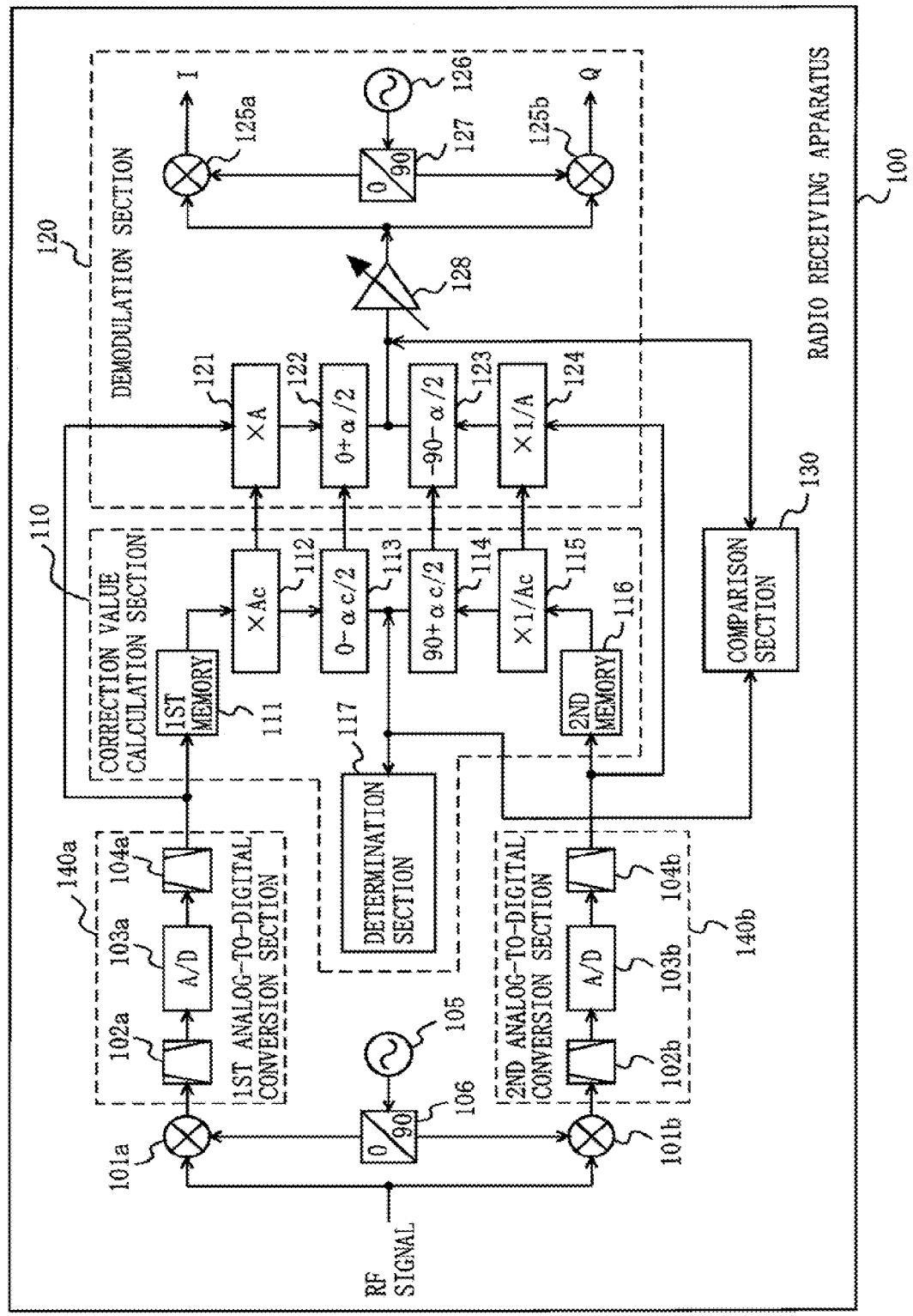
FIG. 1B is a block diagram showing a functional structure of the radio receiving apparatus 100 including a variable gain amplifier.
Figure 1C:
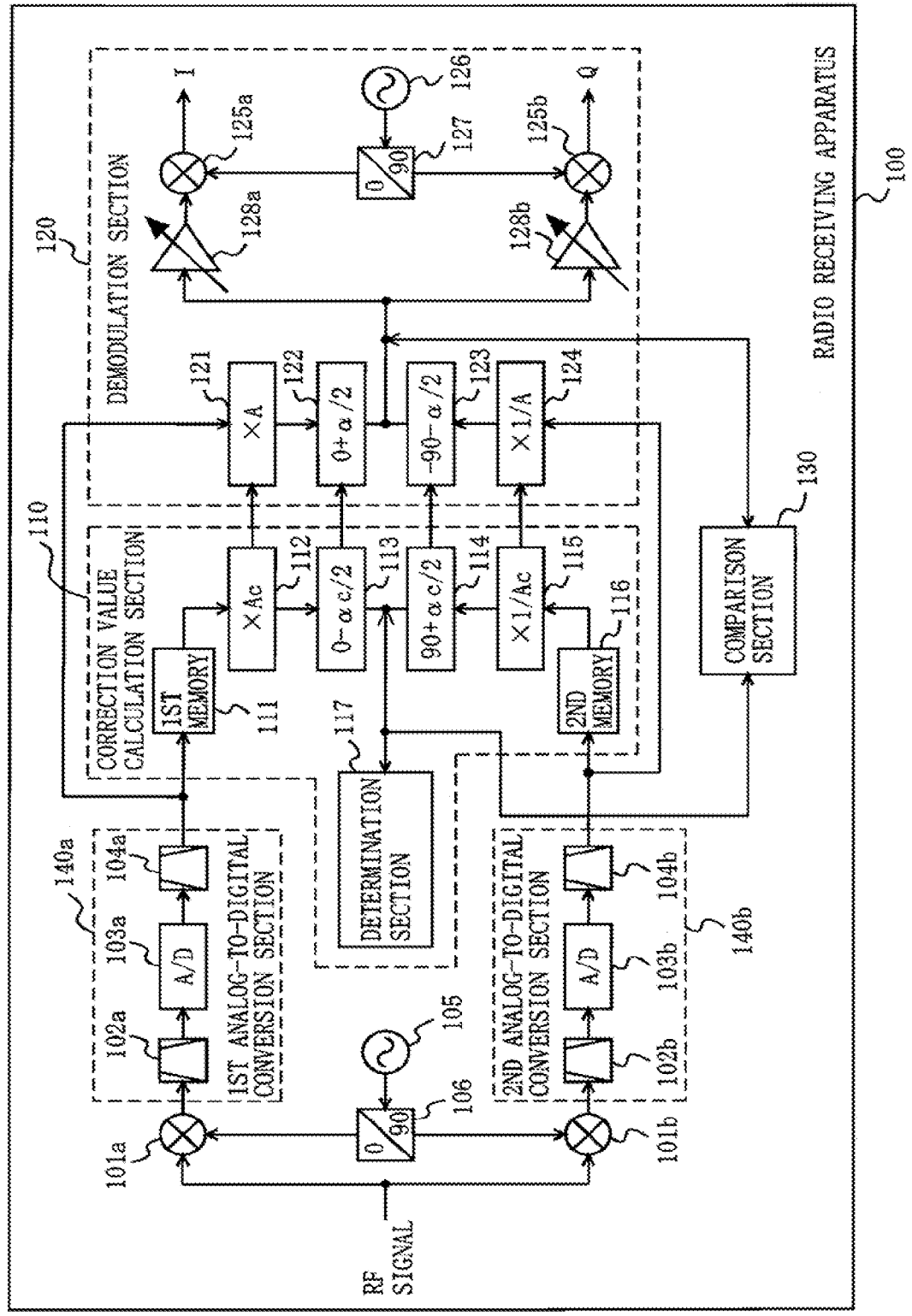
FIG. 1C is a block diagram showing another functional structure of the radio receiving apparatus 100 including variable gain amplifiers.

Note that the radio receiving apparatus 100 may include a variable gain amplifier 128 at a stage prior to the third down-converter 125a and the fourth down-converter 125b. FIG. 1B is a block diagram showing a functional structure of the radio receiving apparatus 100 including the variable gain amplifier 128. In FIG. 1B, in order to make constant the level of a signal (the second combined signal) to be inputted to the third down-converter 125a and the fourth down-converter 125b, the variable gain amplifier 128 adjusts the gain for amplifying the second combined signal. Due to being connected at this position, the variable gain amplifier 128 receives the second combined signal from which the image frequency signals are suppressed, and therefore it is possible to recognize the precise levels of the desired signals. Thus, the variable gain amplifier 128 can make compensation for the level of the second combined signal based on the precise levels of the desired signals. Alternatively, the radio receiving circuit 100 may have a structure shown in FIG. 1C.

Next, described is the reason why the amplitude correction candidate value Ac and the phase correction candidate value αc/2 which correspond to the inflection point of the first combined signal are optimum amplitude correction value A and phase correction value α/2, respectively.

FIG. 2A is a 3D contour diagram showing a case where values of the first combined signal are obtained when the amplitude correction candidate value Ac and the phase correction candidate value αc/2 are changed on the assumption that neither the amplitude error nor the phase error are present (i.e., on the assumption that B=0 dB and θ=0 degrees). When neither the amplitude error nor the phase error are present, neither the amplitude correction value A nor the phase correction value α/2 are required to be set in the demodulation section 120. That is, it may be that the amplitude correction value A=0 dB and the phase correction value α/2=0 degrees. As shown in FIG. 2A, the amplitude correction candidate value Ac=0 dB and the phase correction candidate value αc/2=0 which correspond to the amplitude correction value A=0 dB and the phase correction value α/2=0, respectively, are values obtained at an inflection point X of the first combined signal. Thus, in order to obtain appropriate amplitude correction value A and phase correction value α/2, the amplitude correction candidate value Ac and the phase correction candidate value αc/2 which correspond to the inflection point of the first combined signal may be obtained.

Figure 2B:
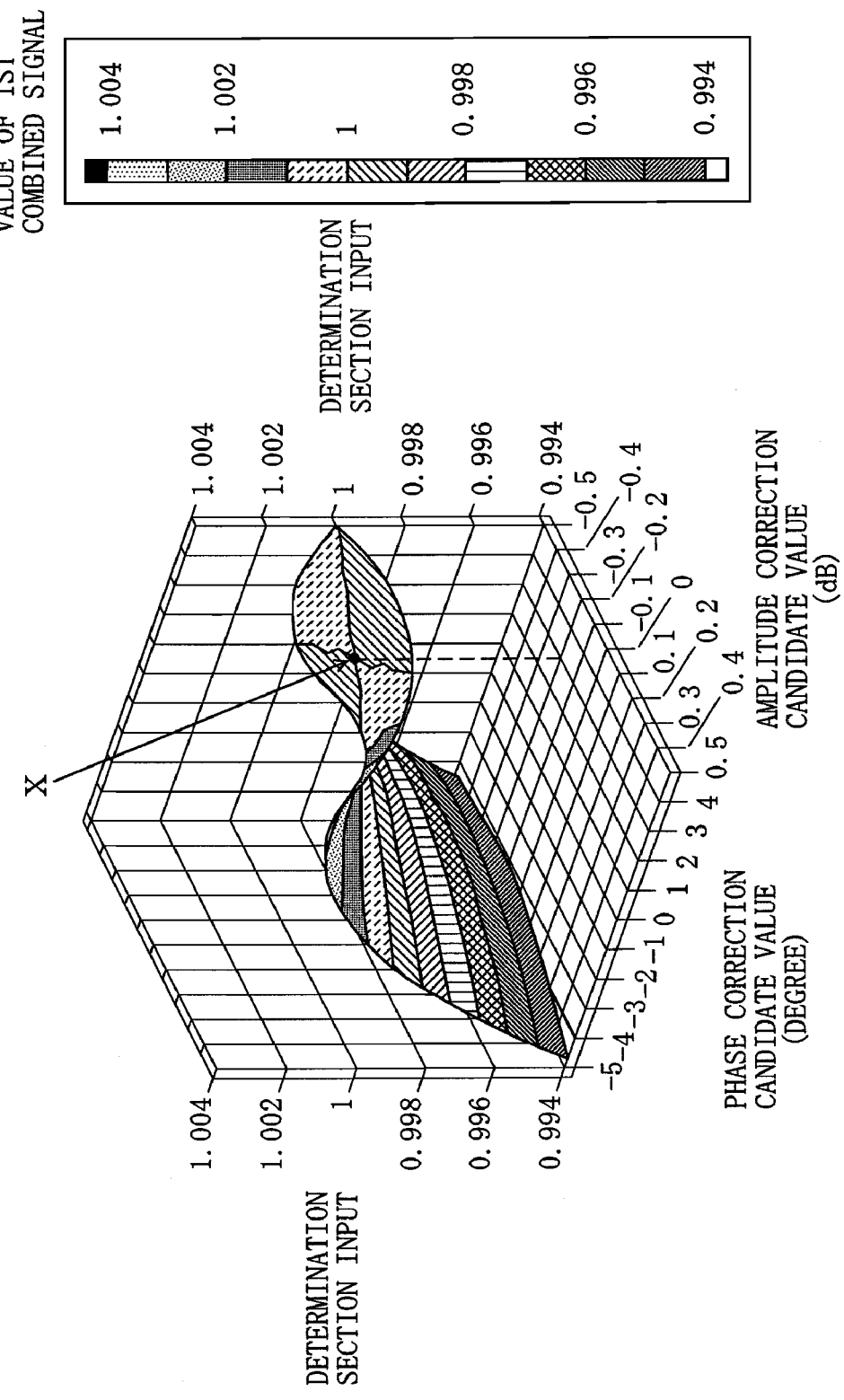
FIG. 2B is a 3D contour diagram showing a case where a value of the first combined signal is obtained when the amplitude correction candidate value Ac and the phase correction candidate value αc/2 are changed on the assumption that the amplitude error and the phase error are present.

FIG. 2B is a 3D contour diagram showing a case where values of the first combined signal are obtained when the amplitude correction candidate value Ac and the phase correction candidate value αc/2 are changed on the assumption that the amplitude error and the phase error are present. In FIG. 2B, the amplitude error B is 0.2 dB and the phase error θ is 3 degrees. In this case, in the amplitude correction candidate value Ac and the phase correction candidate value αc/2 which correspond to an inflection point X, Ac=−0.2 dB and αc=3 degrees, respectively. Accordingly, the correction value calculation section 110 sets the amplitude correction value A as −0.2 dB and the phase correction value α as 3 degrees. In response thereto, the demodulation section 120 makes amplitude compensation and phase compensation.

As described above, according to the first embodiment, the bit error rate is not required to be used as is conventionally done, since it is only required to set the inflection point of the first combined signal obtained by two-dimensional matrix calculations, as the amplitude correction value and the phase correction value. Thus, a radio receiving apparatus capable of making compensation for the amplitudes and the phases and of suppressing image interference in a short period of time is provided.

Second Embodiment

Figure 3:
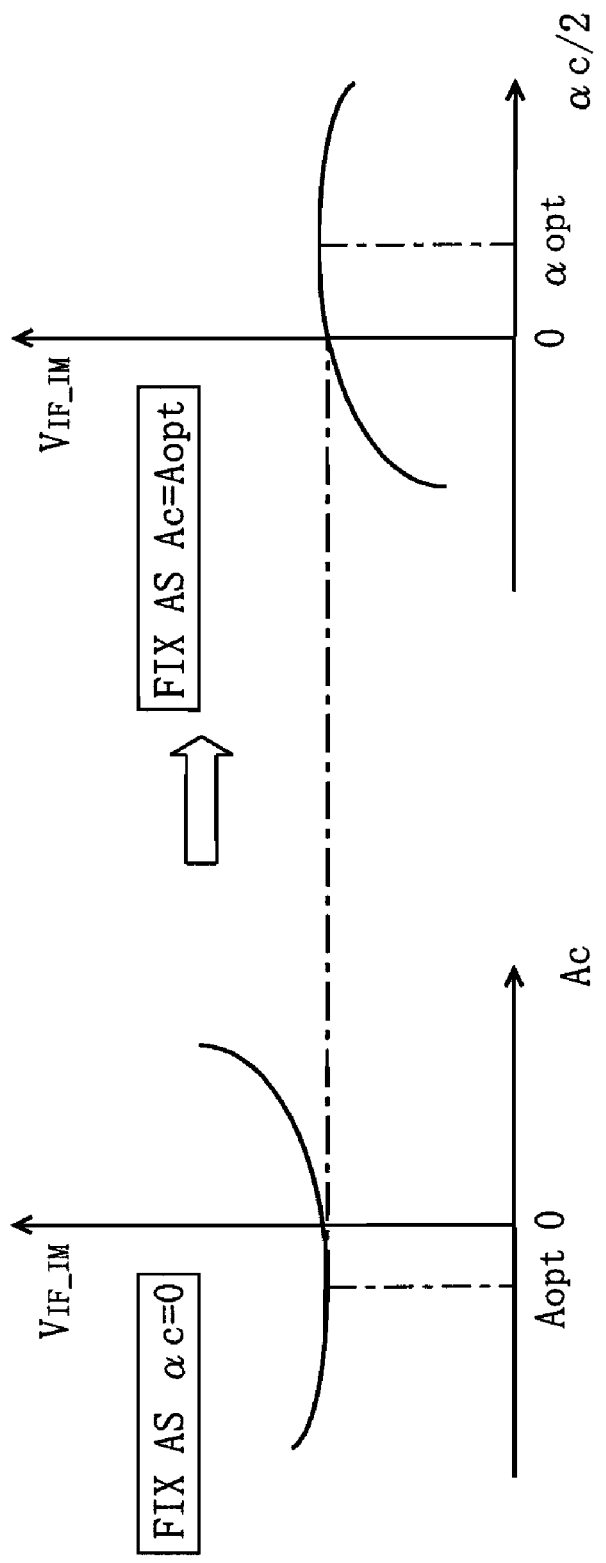
FIG. 3 is a diagram for illustrating a calculation algorithm used in a correction value calculation section 110 of a radio receiving apparatus 100 according to a second embodiment of the present invention.

FIG. 1A is used for showing a radio receiving apparatus, according to a second embodiment, which is similar in structure to that according to the first embodiment. The second embodiment is different from the first embodiment in calculation algorithm used in the correction value calculation section 110. FIG. 3 is a diagram for illustrating a calculation algorithm used in the correction value calculation section 110 of the radio receiving apparatus 100 according to the second embodiment of the present invention.

In the first embodiment, the correction value calculation section 110 selects the amplitude correction candidate value Ac and the phase correction candidate value αc from the predetermined ranges and obtains the first combined signal by two-dimensional matrix calculations, so as to obtain the inflection point. However, it requires a large amount of memory to perform two-dimensional matrix calculations.

In the second embodiment, the determination section 117 of the correction value calculation section 110 first fixes the phase correction candidate value αc used in the first shift section 113 and the second phase shift section 114, as 0 degrees. Then, the determination section 117 of the correction value calculation section 110 obtains, by one-dimensional matrix calculations (vector calculations), an amplitude correction candidate value Aopt for minimizing the level of the first combined signal (see the left-hand diagram of FIG. 3). Then, the determination section 117 of the correction value calculation section 110 fixes the amplitude correction candidate value Ac used in the first multiplication section 112 and the second multiplication section 115, as the obtained Aopt. Then, the determination section 117 of the correction value calculation section 110 obtains, by one-dimensional matrix calculations, a phase correction candidate value αopt for maximizing the level of the first combined signal (see the right-hand diagram of FIG. 3). Last of all, the correction value calculation section 110 inputs, to the demodulation section 120, the amplitude correction candidate value Aopt and the phase correction candidate value αopt as the amplitude correction value A and the phase correction value α/2, respectively.

Fixing a phase correction candidate value so as to obtain an amplitude correction candidate value for minimizing the level of the first combined signal, and fixing the obtained amplitude correction candidate value so as to obtain a phase correction candidate value for maximizing the level of the first combined signal, as described above, is equal to obtaining an inflection point, since the first combined signal is horseshoe-shaped as shown in FIGS. 2A and 2B.

As described above, according to the second embodiment, it is possible to make compensation for the amplitudes and the phases with a small amount of memory and suppress image interference, since it is possible to obtain the inflection point of the first combined signal by one-dimensional matrix calculations.

Note that in the second embodiment, the first combined signal is obtained by one-dimensional matrix calculations so as to obtain a minimum value and a maximum value thereof. However, the correction value calculation section 110 may obtain the minimum value by fixing the phase correction candidate value and obtaining, by sequential calculations, the first combined signal while sweeping the amplitude correction candidate value Ac. Further, the correction value calculation section 110 may obtain the maximum value by fixing the amplitude correction candidate value Aopt corresponding to the obtained minimum value and obtaining, by sequential calculations, the first combined signal while sweeping the phase correction candidate value αc. The sequential calculations as used herein refers to a calculation method for obtaining a value by slightly changing a correction candidate value so as to obtain another value by slightly changing the obtained value.

Figure 4:
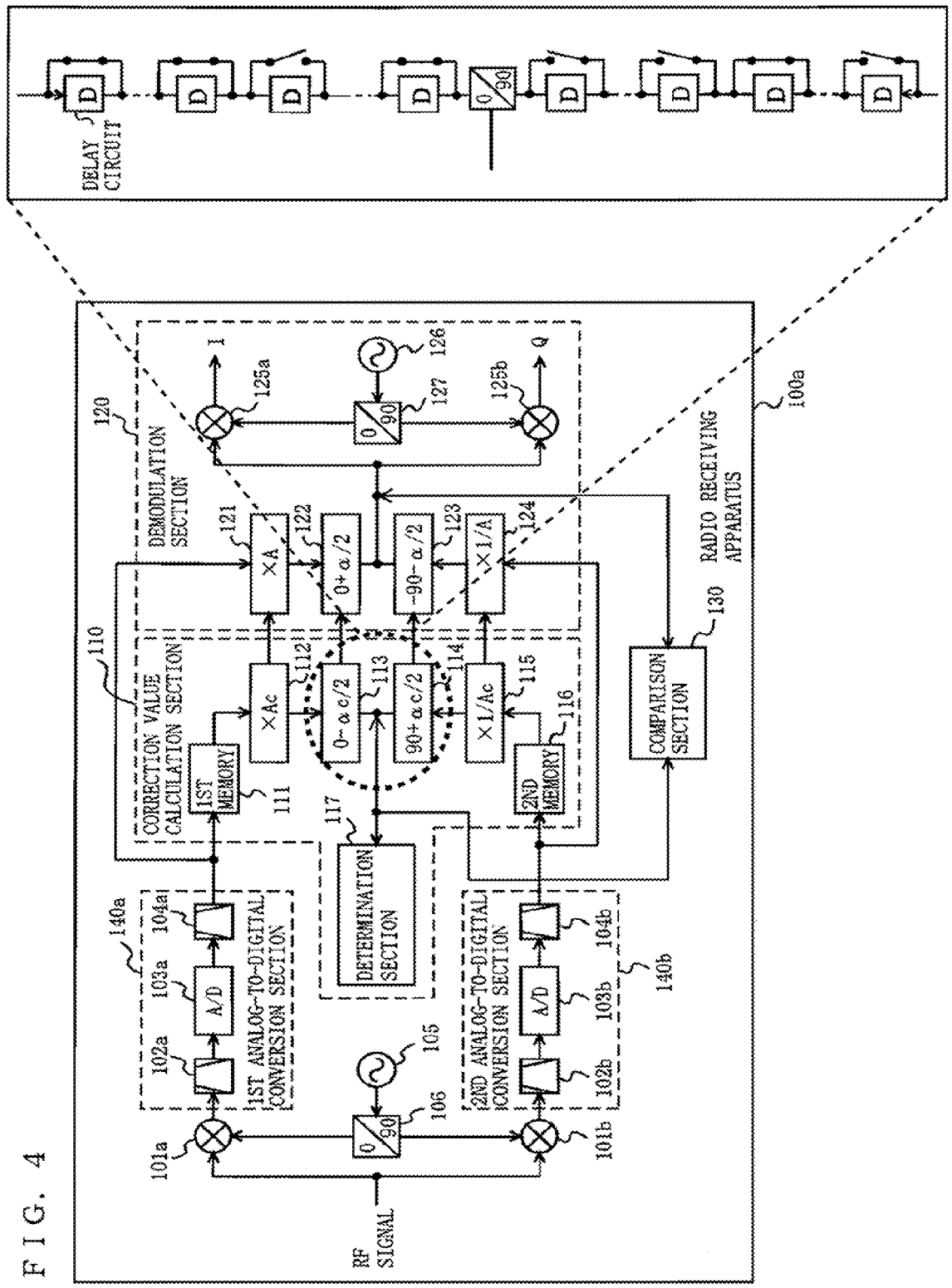
FIG. 4 is a block diagram showing a functional structure of a radio receiving apparatus 100a for obtaining the first combined signal by sequential calculations.

The radio receiving apparatus for obtaining the first combined signal by sequential calculations may have a structure shown in FIG. 4, for example. FIG. 4 is a block diagram showing a functional structure of a radio receiving apparatus 100a for obtaining the first combined signal by sequential calculations. In FIG. 4, the radio receiving apparatus 100a is characterized by structures of the first phase shift section 113 and the second phase shift section 114. As shown in FIG. 4, the first phase shift section 113 and the second phase shift section 114 include a plurality of delay circuits, a plurality of switches, and a 90-degree phase combiner.

Third Embodiment

Figure 5:
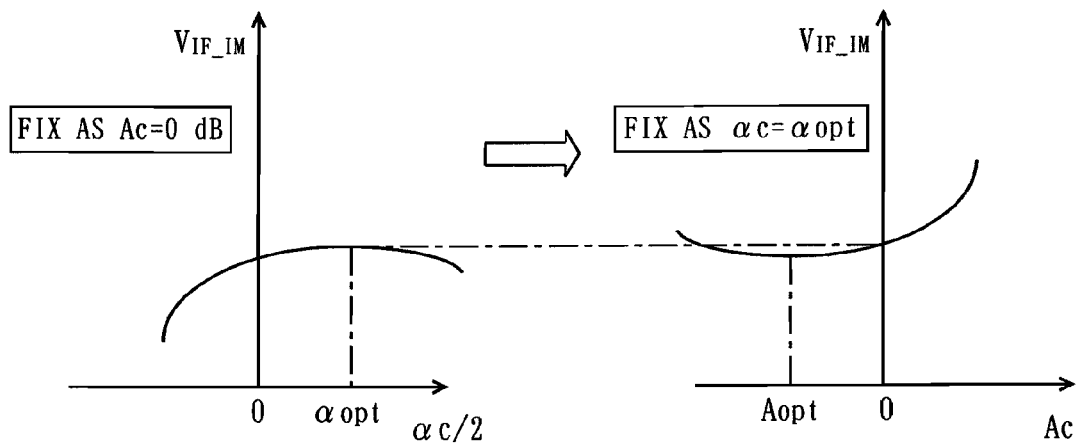
FIG. 5 is a diagram for illustrating a calculation algorithm used in a correction value calculation section 110 of a radio receiving apparatus 100 according to a third embodiment of the present invention.

FIG. 1A is used for showing a radio receiving apparatus, according to a third embodiment, which is similar in structure to that according to the first embodiment. The third embodiment is different from the first embodiment in calculation algorithm used in the correction value calculation section 110. FIG. 5 is a diagram for illustrating a calculation algorithm used in the correction value calculation section 110 of the radio receiving apparatus 100 according to the third embodiment of the present invention.

In the first embodiment, the correction value calculation section 110 selects the amplitude correction candidate value Ac and the phase correction candidate value αc from the predetermined ranges and obtains the first combined signal by two-dimensional matrix calculations, so as to obtain the inflection point. However, it requires a large amount of memory to perform two-dimensional matrix calculations.

In the third embodiment, the determination section 117 of the correction value calculation section 110 first fixes the amplitude correction candidate value Ac used in the first multiplication section 112 and the second multiplication section 115, as 0 dB. Then, the determination section 117 of the correction value calculation section 110 obtains, by one-dimensional matrix calculations, a phase correction candidate value αopt for maximizing the level of the first combined signal (see the left-hand diagram of FIG. 5). Then, the determination section 117 of the correction value calculation section 110 fixes the phase correction candidate value αc used in the first phase shift section 113 and the second phase shift section 114, as the obtained αopt. Then, the determination section 117 of the correction value calculation section 110 obtains, by one-dimensional matrix calculations, an amplitude correction candidate value Aopt for minimizing the level of the first combined signal (see the right-hand diagram of FIG. 5). Last of all, the correction value calculation section 110 inputs, to the demodulation section 120, the amplitude correction candidate value Aopt and the phase correction candidate value αopt as the amplitude correction value A and the phase correction value α/2, respectively.

Fixing an amplitude correction candidate value so as to obtain a phase correction candidate value for maximizing the level of the first combined signal, and fixing the obtained phase correction candidate value so as to obtain an amplitude correction candidate value for minimizing the level of the first combined signal, as described above, is equal to obtaining an inflection point, since the first combined signal is horseshoe-shaped as shown in FIGS. 2A and 2B.

As described above, according to the third embodiment, it is possible to make compensation for the amplitudes and the phases with a small amount of memory and suppress image interference, since it is possible to obtain the inflection point of the first combined signal by one-dimensional matrix calculations.

Note that in the third embodiment, the first combined signal is obtained by one-dimensional matrix calculations so as to obtain a minimum value and a maximum value thereof. However, the correction value calculation section 110 may obtain the maximum value by fixing the amplitude correction candidate value and obtaining, by sequential calculations, the first combined signal while sweeping the phase correction candidate value αc. Further, the correction value calculation section 110 may obtain the minimum value by fixing the phase correction candidate value αopt corresponding to the obtained maximum value and obtaining, by sequential calculations, the first combined signal while sweeping the amplitude correction candidate value Ac.

Note that two-dimensional matrix calculations, one-dimensional matrix calculations, and sequential calculations performed in the first through third embodiments may use any known methods as specific methods, and therefore are not particularly specified.

Fourth Embodiment

FIG. 1A is used for showing a radio receiving apparatus, according to a fourth embodiment, which is similar in structure to that according to the first embodiment. Note, however, that the radio receiving apparatus 100 according to the fourth embodiment employs a Low-IF method by which the frequency conversion section down-converts the RF signal to a Low-IF bandwidth. In the Low-IF method, an image signal is present in a channel adjacent to a desired signal. Accordingly, it is possible to perform symbol synchronization of the image signal as well as symbol synchronization of the desired signal, depending on an application to be used. The symbol synchronization as used herein refers to the act of extracting the timing of an original symbol included in symbol data obtained by sampling so as to reproduce the original symbol.

Figure 6:
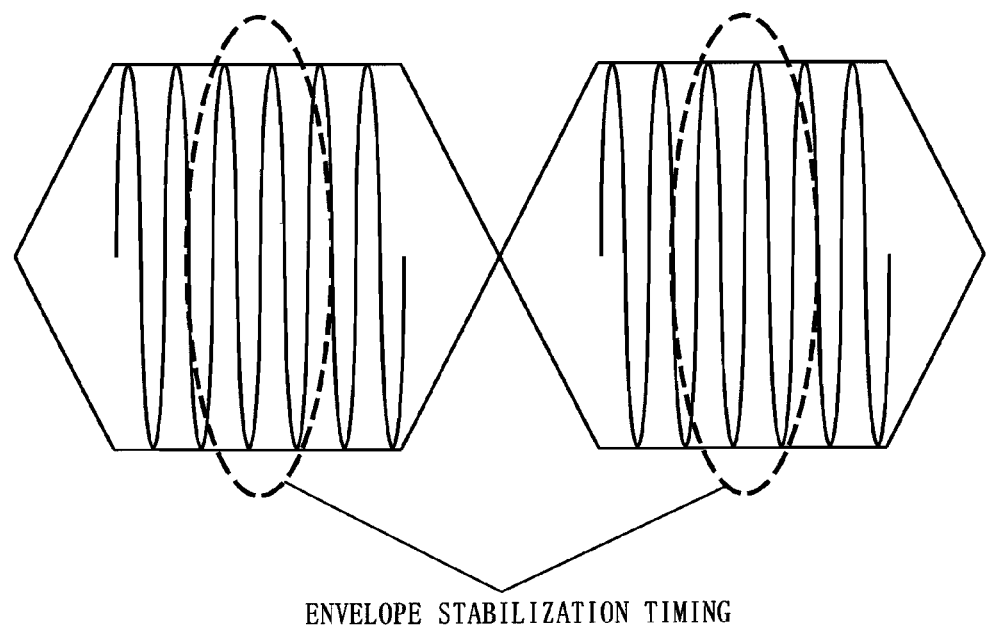
FIG. 6 is a schematic diagram showing a waveform of a symbol reproduced when symbol synchronization of an image signal is performed.

FIG. 6 is a schematic diagram showing a waveform of a symbol reproduced when the symbol synchronization of the image signal is performed. As shown in FIG. 6, the symbol reproduced when the symbol synchronization of the image signal is performed, includes the timing for stabilizing an envelope. Accordingly, the determination section 117 of the correction value calculation section 110 performs the symbol synchronization of the image signal, so as to detect the timing for stabilizing the envelope of the reproduced symbol. Then, the determination section 117 of the correction value calculation section 110 obtains an inflection point around the middle of the timing. Thus, it is possible to obtain the amplitude correction value and the phase correction value each having a small error.

Note that the fourth embodiment is applicable to embodiments other than the first embodiment.

Fifth Embodiment

In recent years, in order to perform high-speed communication, the bandwidth of one channel is enormously wide. In such a communication method, only one pair of correction values may not be sufficient to suppress image interference. In a fifth embodiment, a radio receiving apparatus is proposed for suppressing image interference even in a communication method in which the bandwidth of one channel is enormously wide.

Figure 7:
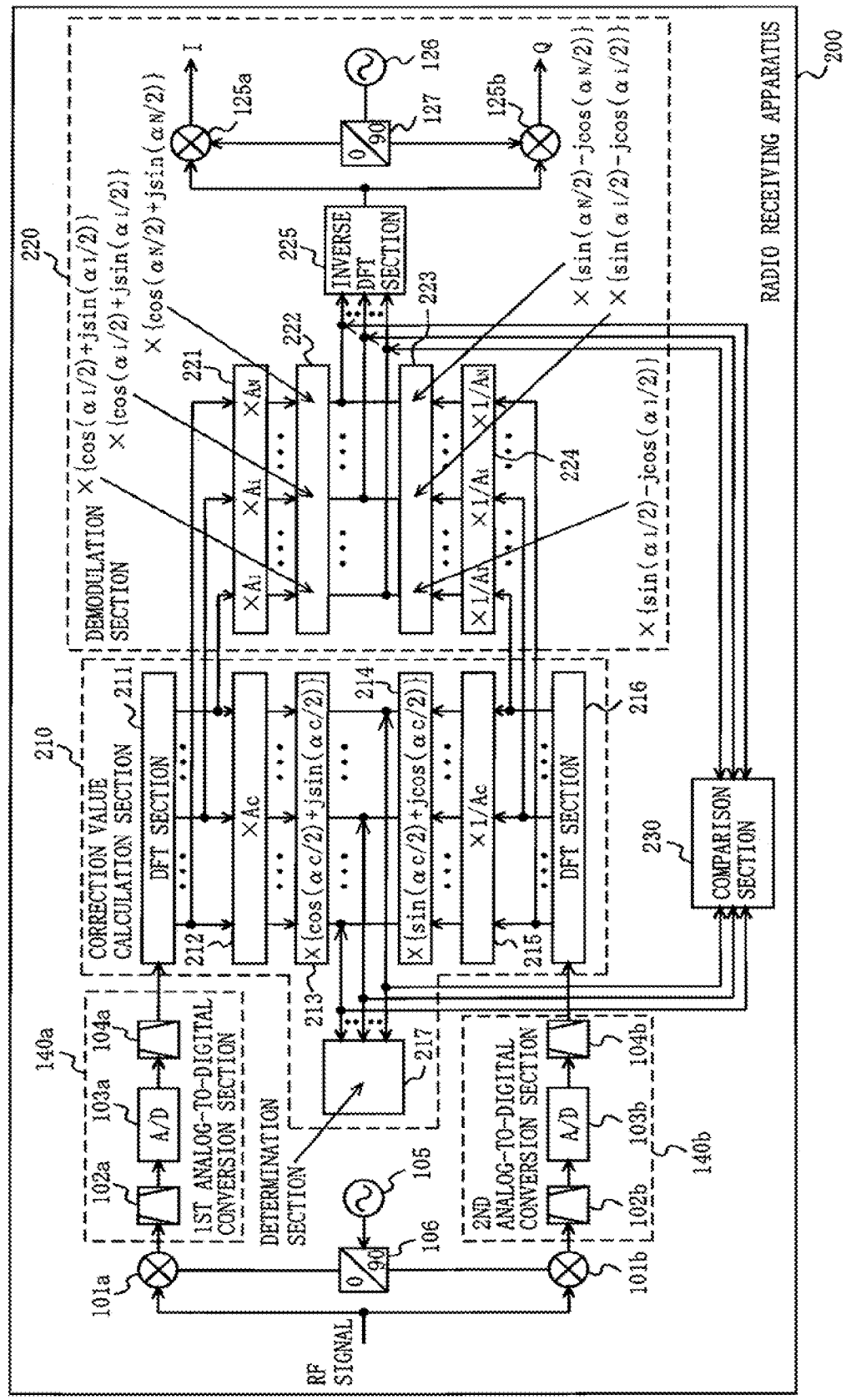
FIG. 7 is a block diagram showing a functional structure of a radio receiving apparatus 200 according to a fifth embodiment of the present invention.

FIG. 7 is a block diagram showing a functional structure of a radio receiving apparatus 200 according to the fifth embodiment of the present invention. In FIG. 7, elements having the same functions as those of the radio receiving apparatus 100 according to the first embodiment will be denoted by the same reference numerals, and therefore will not be described.

In FIG. 7, the radio receiving apparatus 200 includes a first down-converter 101a, a first analog-to-digital conversion section 140a, a second down-converter 101b, a second analog-to-digital conversion section 140b, a local oscillator 105, a first 90-degree phase shifter 106, a correction value calculation section 210, a demodulation section 220, and a comparison section 230.

The correction value calculation section 210 includes a first digital Fourier transform section 211, a first multiplication section 212, a first phase shift section 213, a second phase shift section 214, a second multiplication section 215, a second digital Fourier transform section 216, and a determination section 217.

The demodulation section 220 includes a third multiplication section 221, a third phase shift section 222, a fourth phase shift section 223, a fourth multiplication section 224, an inverse digital Fourier transform section 225, and a third down-converter 125a, a fourth down-converter 125b, a clock generation section 126, and a second 90-degree phase shifter 127. Note that the first digital Fourier transform section 211 and the second digital Fourier transform section 216 may be provided outside the correction value calculation section 210.

The first digital Fourier transform section 211 digital-Fourier-transforms a first digital signal so as to output each frequency component thereof. The second digital Fourier transform section 216 digital-Fourier-transforms a second digital signal so as to output each frequency component thereof.

In the third multiplication section 221, the demodulation section 220 multiplies each frequency component of the digital-Fourier-transformed first digital signal by an amplitude correction value $A_1, \ldots, A_i, \ldots, A_N$. In the third phase shift section 222, the demodulation section 220 performs, based on a phase correction value $\alpha_1/2, \ldots, \alpha_i/2, \ldots, \alpha_N/2$, a rotation process for each frequency component of the multiplication result obtained in the third multiplication section 221. Specifically, the third phase shift section 222 multiplies each frequency component of the multiplication result obtained in the third multiplication section 221, by $\cos(\alpha_i/2)+j \sin(\alpha_i/2)$. Herein, j represents an imaginary component.

Further, in the fourth multiplication section 224, the demodulation section 220 multiplies each frequency component of the digital-Fourier-transformed second digital signal by the multiplicative inverse of the amplitude correction value $A_1, \ldots, A_i, \ldots, A_N$. In the fourth phase shift section 223, the demodulation section 220 performs, based on the phase correction value $\alpha_1/2, \ldots, \alpha_i/2, \ldots, \alpha_N/2$, a rotation process for each frequency component of the multiplication result obtained in the fourth multiplication section 224. Specifically, the fourth phase shift section 223 multiplies each frequency component of the multiplication result obtained in the fourth multiplication section 224, by $\sin(\alpha_i/2)-j \cos(\alpha_i/2)$.

The demodulation section 220 combines each frequency component outputted from the third phase shift section 222, with each frequency component outputted from the fourth phase shift section 223, so as to input each combined frequency component as a second combined signal to the inverse digital Fourier transform section 225. The inverse digital Fourier transform section 225 inverse-digital-Fourier-transforms each frequency component of the second combined signal so as to output a signal. In a similar manner to the first embodiment, the signal outputted from the inverse digital Fourier transform section 225 is converted into an in-phase component and a quadrature component.

Thus, the demodulation section 220 makes corrections to the amplitude and the phase of each frequency component of the digital-Fourier-transformed first and second digital signals and rejects an image frequency signal therefrom, so as to demodulate an RF signal by inverse-digital-Fourier-transforming each frequency component obtained after the corrections and the image frequency rejection.

In the first multiplication section 212, the correction value calculation section 210 multiplies each frequency component of the digital-Fourier-transformed first digital signal by an amplitude correction candidate value Ac. In the first phase shift section 213, the correction value calculation section 210 performs, based on a phase correction candidate value $\alpha c$, a rotation process for each frequency component of the multiplication result obtained in the first multiplication section 212. Specifically, the first phase shift section 213 multiplies each frequency component of the multiplication result obtained in the first multiplication section 212, by $\cos(\alpha c/2)+j \sin(\alpha c/2)$.

Further, in the second multiplication section 215, the correction value calculation section 210 multiplies each frequency component of the digital-Fourier-transformed second digital signal by the multiplicative inverse of the amplitude correction candidate value Ac. In the second phase shift section 214, the correction value calculation section 210 performs, based on the phase correction candidate value $\alpha c$, phase rotation for each frequency component of the multiplication result obtained in the second multiplication section 215, the phase rotation being in a quadrature relationship with that performed for the first digital signal. Specifically, the second phase shift section 214 multiplies each frequency component of the multiplication result obtained in the second multiplication section 215, by $\sin(\alpha c/2)+j \cos(\alpha c/2)$. The rotation angle obtained in the first phase shift section 213 and the rotation angle obtained in the second phase shift section 214 are in a quadrature relationship, since $\{\cos(\alpha c/2)+j \sin(\alpha c/2)\} \times \{\sin(\alpha c/2)+j \cos(\alpha c/2)\}=j$.

The correction value calculation section 210 combines each frequency component outputted from the first phase shift section 213, with each frequency component outputted from the second phase shift section 214, so as to input each combined frequency component as a first combined signal to the determination section 217.

Thus, the correction value calculation section 210 obtains, with respect to each frequency component, the first combined signal within a predetermined range of the amplitude correction candidate value Ac and a predetermined range of the phase correction candidate value $\alpha c$. The determination section 217 obtains the first combined signal with respect to each frequency component, and therefore can obtain an inflection point of each frequency component. The amplitude correction candidate value and the phase correction candidate value which correspond to the inflection point, obtained in the determination section 217, of each frequency component, are inputted to the demodulation section 220, as the amplitude correction value $A_1, \ldots, A_i, \ldots, A_N$ and the phase correction value $\alpha_1/2, \ldots, \alpha_i/2, \ldots, \alpha_N/2$, respectively. The inflection point of each frequency component may be obtained by two-dimensional matrix calculations in a similar manner to the first embodiment, or may be obtained by one-dimensional matrix calculations or sequential calculations in a similar manner to the second embodiment. A calculation method for obtaining the inflection point is not particularly specified.

At the initiation of the operation, the comparison section 230 compares the levels of the first and second combined signals to each other, with respect to each frequency component. When a frequency component is present in such a manner that the level of the first combined signal is more than a predetermined level (e.g., 10 dB to 30 dB) greater than the level of the second combined signal, the comparison section 230 determines that the operation is to proceed to a correction stage for the demodulation section 220 to make corrections, and gives instructions to the correction value calculation section 210 and the demodulation section 220. On the other hand, when a frequency component is not present in such a manner that the level of the first combined signal is more than the predetermined level (e.g., 10 dB to 30 dB) greater than the level of the second combined signal, the comparison section 230 gives the demodulation section 220 an instruction to demodulate the second combined signal by the amplitude correction value A=0 dB and the phase correction value $\alpha/2$=0 degrees.

In the case of proceeding to the correction stage, the correction value calculation section 210 obtains the amplitude correction value $A_1, \ldots, A_i, \ldots, A_N$ and the phase correction value $\alpha_1/2, \ldots, \alpha_i/2, \ldots, \alpha_j/2$, with respect to each frequency component, so as to cause the demodulation section 220 to make corrections.

Thus, it is possible to make corrections to the amplitudes and the phases and suppress image interference, even in a broadband signal.

Sixth Embodiment

Figure 8:
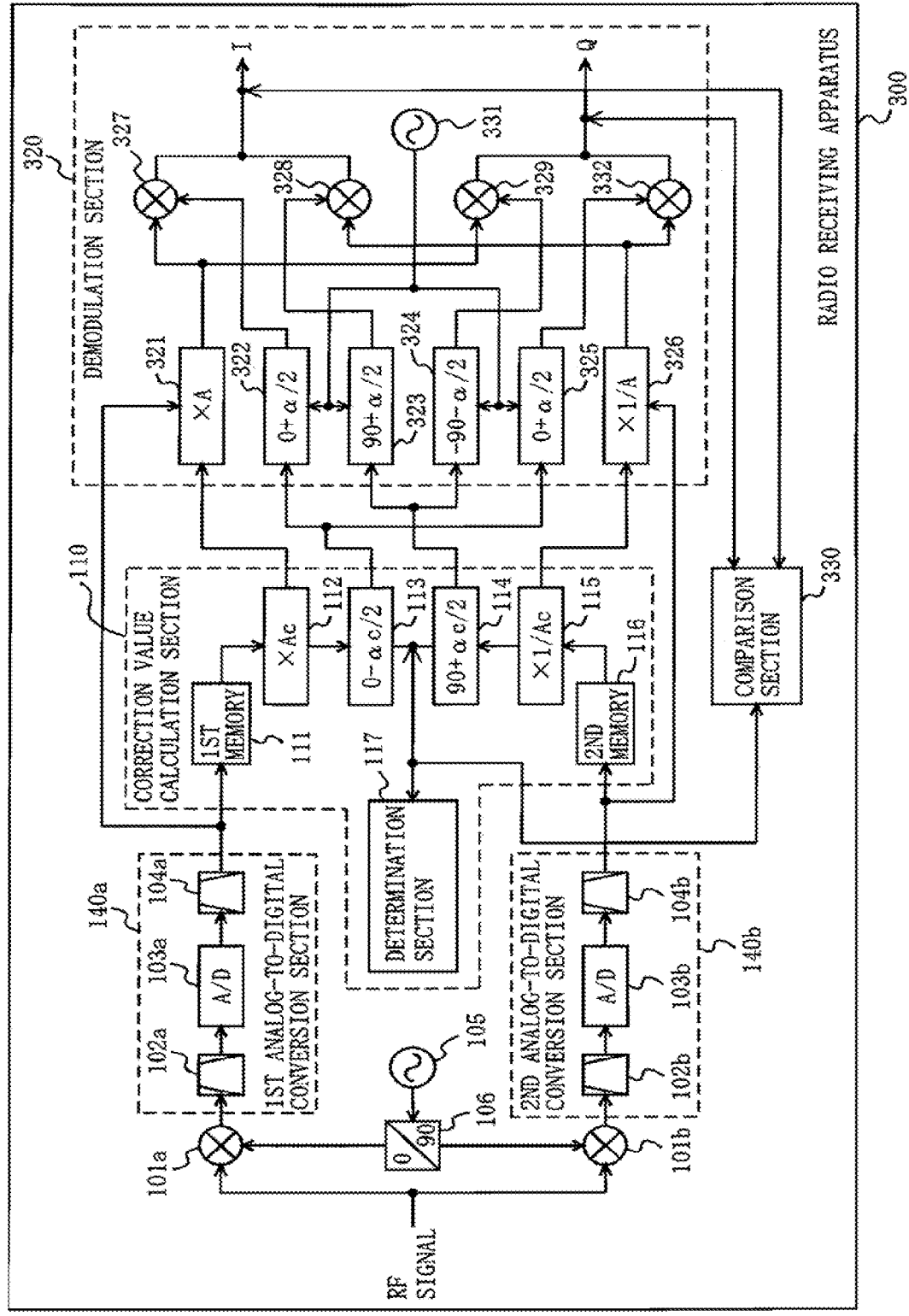
FIG. 8 is a block diagram showing a functional structure of a radio receiving apparatus 300 according to a sixth embodiment of the present invention.

FIG. 8 is a block diagram showing a functional structure of a radio receiving apparatus 300 according to a sixth embodiment of the present invention. In FIG. 8, elements having the same functions as those of the radio receiving apparatus 100 according to the first embodiment will be denoted by the same reference numerals, and therefore will not be described.

In FIG. 8, the radio receiving apparatus 300 includes a first down-converter 101a, a first analog-to-digital conversion section 140a, a second down-converter 101b, a second analog-to-digital conversion section 140b, a local oscillator 105, a first 90-degree phase shifter 106, a correction value calculation section 110, a demodulation section 320, and a comparison section 330.

The demodulation section 320 includes a third multiplication section 321, a third phase shift section 322, a fourth phase shift section 323, a fifth phase shift section 324, a sixth phase shift section 325, a fourth multiplication section 326, a third down-converter 327, a fourth down-converter 328, a fifth down-converter 329, a sixth down-converter 332, and a clock generation section 331.

In the third down-converter 327, the demodulation section 320 multiplies a signal, obtained by multiplying a first digital signal by an amplitude correction value A in the third multiplication section 321, by a signal obtained by rotating the phase of a clock signal outputted from the clock generation section 331 by a phase correction value $\alpha/2$ degrees in the third phase shift section 322, so as to obtain a first signal.

In the fourth down-converter 328, the demodulation section 320 multiplies a signal, obtained by multiplying a second digital signal by the multiplicative inverse of the amplitude correction value A in the fourth multiplication section 326, by a signal obtained by rotating the phase of the clock signal by 90 degrees and by the phase correction value $\alpha/2$ degrees in the fourth phase shift section 323, so as to obtain a second signal.

In the fifth down-converter 329, the demodulation section 320 multiplies a signal, obtained by multiplying the first digital signal by the amplitude correction value A in the third multiplication section 321, by a signal obtained by rotating the phase of the clock signal by minus 90 degrees and counter-rotating the phase of the clock signal by the phase correction value $\alpha/2$ degrees, so as to obtain a third signal.

In the sixth down-converter 332, the demodulation section 320 multiplies a signal, obtained by multiplying the second digital signal by the multiplicative inverse of the amplitude correction value A in the fourth multiplication section 326, by a signal obtained by rotating the phase of the clock signal by the phase correction value $\alpha/2$ degrees, so as to obtain a fourth signal.

The demodulation section 320 sets a combined signal of the first signal and the second signal as an in-phase component. The demodulation section 320 sets a combined signal of the third signal and the fourth signal as a quadrature component. Thus, the demodulation section 320 rejects image signals by the Weaver method.

At the initiation of the operation, the comparison section 330 sets the amplitude correction value A=0 dB and the phase correction value $\alpha/2$=0 degrees, so as to compare the level of the first combined signal obtained in the correction value calculation section 110 to the sizes of the vectors of the in-phase component and the quadrature component obtained in the demodulation section 320. When the level of the first combined signal is more than a predetermined value greater than the sizes of the vectors, the comparison section 330 gives the demodulation section 320 and the correction value calculation section 110 instructions to proceed to a correction stage. In response thereto, the demodulation section 320 makes corrections based on the correction values outputted from the correction value calculation section 110.

Thus, the demodulation section 320 may have any structure capable of suppressing image signals, and therefore may employ the Hartley method in a similar manner to the first embodiment or may employ the Weaver method in a similar manner to the sixth embodiment.

Seventh Embodiment

Figure 9:
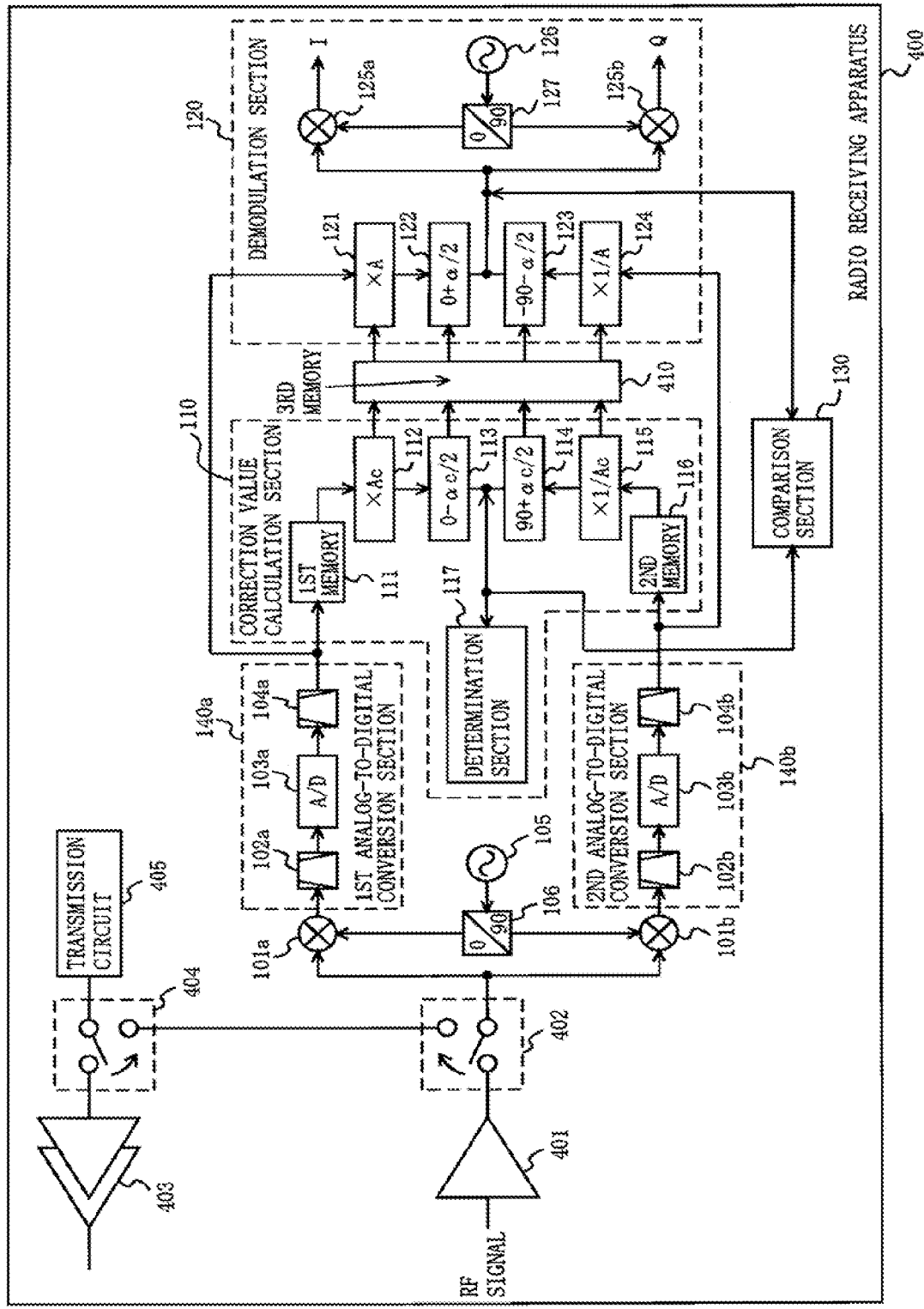
FIG. 9 is a block diagram showing a functional structure of a radio receiving apparatus 400 according to a seventh embodiment of the present invention.

FIG. 9 is a block diagram showing a functional structure of a radio receiving apparatus 400 according to a seventh embodiment of the present invention. In FIG. 9, elements having the same functions as those of the radio receiving apparatus 100 according to the first embodiment, as shown in FIG. 1A, will be denoted by the same reference numerals, and therefore will not be described.

In FIG. 9, the radio receiving apparatus 400 includes an amplifier at the receiving end 401, a first switch circuit 402, an amplifier at the transmitting end 403, a second switch circuit 404, a transmission circuit 405, a first down-converter 101a, first analog-to-digital conversion section 140a, a second down-converter 101b, a second analog-to-digital conversion section 140b, a local oscillator 105, a first 90-degree phase shifter 106, a correction value calculation section 110, a demodulation section 120, a comparison section 130, and a third memory 410. Note that although the radio receiving apparatus 400 according to the seventh embodiment further includes the transmission circuit 405, the radio receiving apparatus 400 is still an apparatus for receiving an RF signal, and therefore is referred to as the radio receiving apparatus also in the seventh embodiment.

The seventh embodiment is different from the first embodiment in that in the seventh embodiment, the correction value calculation section 110 obtains an amplitude correction value and a phase correction value in advance when the radio receiving apparatus 400 is turned on, so as to store the amplitude correction value and the phase correction value in the third memory. Specifically, the correction value calculation section 110 obtains the amplitude correction value and the phase correction value based on IF signals from the transmission circuit.

The radio receiving apparatus 400 operates as described below, when the power is turned on. When the power is turned on, a control section (not shown) provided within the radio receiving apparatus 400 switches the first switch circuit 402 to the transmitting end and switches the second switch circuit 404 to the receiving end. Next, the radio receiving apparatus 400 causes the transmission circuit 405 to output several points of an RF signal at an image frequency. The amplitude correction value and the phase correction value vary depending on the frequency of image signals. Therefore, specifically, the radio receiving apparatus 400 causes the transmission circuit 405 to output the RF signal at a plurality of image frequencies (e.g., the highest frequency, a frequency in between, and the lowest frequency). As a result, the RF signal is inputted to the first down-converter 101a and the second down-converter 101b and converted into IF signals. In a similar manner to the first embodiment, the correction value calculation section 110 obtains the amplitude correction value and the phase correction value, using the IF signals, so as to store the obtained amplitude correction value and phase correction value in the third memory 410.

Next, the radio receiving apparatus 400 switches the first switch circuit 402 to an antenna (not shown) side and switches the second switch circuit 404 to an antenna (not shown) side. Then, an RF signal is received and converted into IF signals, and the IF signals are converted into digital signals, so as to be inputted to the demodulation section 120. The demodulation section 120 first makes corrections using the amplitude correction value and the phase correction value which are stored in the third memory 410 and correspond to the image frequencies.

In the case of receiving, when the power is turned on, an RF signal of which the frequency is different from those of the RF signal outputted from the transmission circuit 405, the radio receiving apparatus 400 causes the correction value calculation section 110 to obtain a new amplitude correction value and a new phase correction value based on the received RF signal. Note that when the comparison section 130 determines that the correction values are not required to be calculated, the correction value calculation section 110 does not obtain the new amplitude correction value or the new phase correction value.

As described above, according to the seventh embodiment, the amplitude correction value and the phase correction value are obtained in advance when the power is turned on, so as to make corrections. Thus, it is possible to make corrections and suppress image interference more quickly. Further, when the frequency of the RF signal changes, the amplitude correction value and the phase correction value can be newly obtained. Thus, it is possible to respond to frequency changes in a flexible manner.

Note that the third memory 410 may be a non-volatile memory, such that calculations for obtaining the correction values may be omitted when the power is turned on for the second time and thereafter.

Note that the correction value calculation section 110 may select, as candidate values for the new amplitude correction value and the new phase correction value, approximate values of the amplitude correction value and the phase correction value, respectively, which are obtained when the power is turned on, so as to obtain an inflection point, using the approximate values. Then, only when the inflection point cannot be found, the range of the candidate values may be broadened so as to obtain the new amplitude correction value and the new phase correction value. Thus, it is possible to obtain the new amplitude correction value and the new phase correction value more quickly.

Note that although described is a case where the radio receiving apparatus 400 employs the structure shown in FIG. 1A, the radio receiving apparatus 400 may employ a structure shown in FIG. 1B, FIG. 1C, FIG. 4, FIG. 7 or FIG. 8. Also in this case, calculations for corrections may be performed by a correction value calculation section based on an RF signal from a transmission circuit, when the power is turned on. Needless to say, any of two-dimensional matrix calculations, one-dimensional matrix calculations, or sequential calculations may be used for the calculation method.

Eighth Embodiment

Figure 10A:
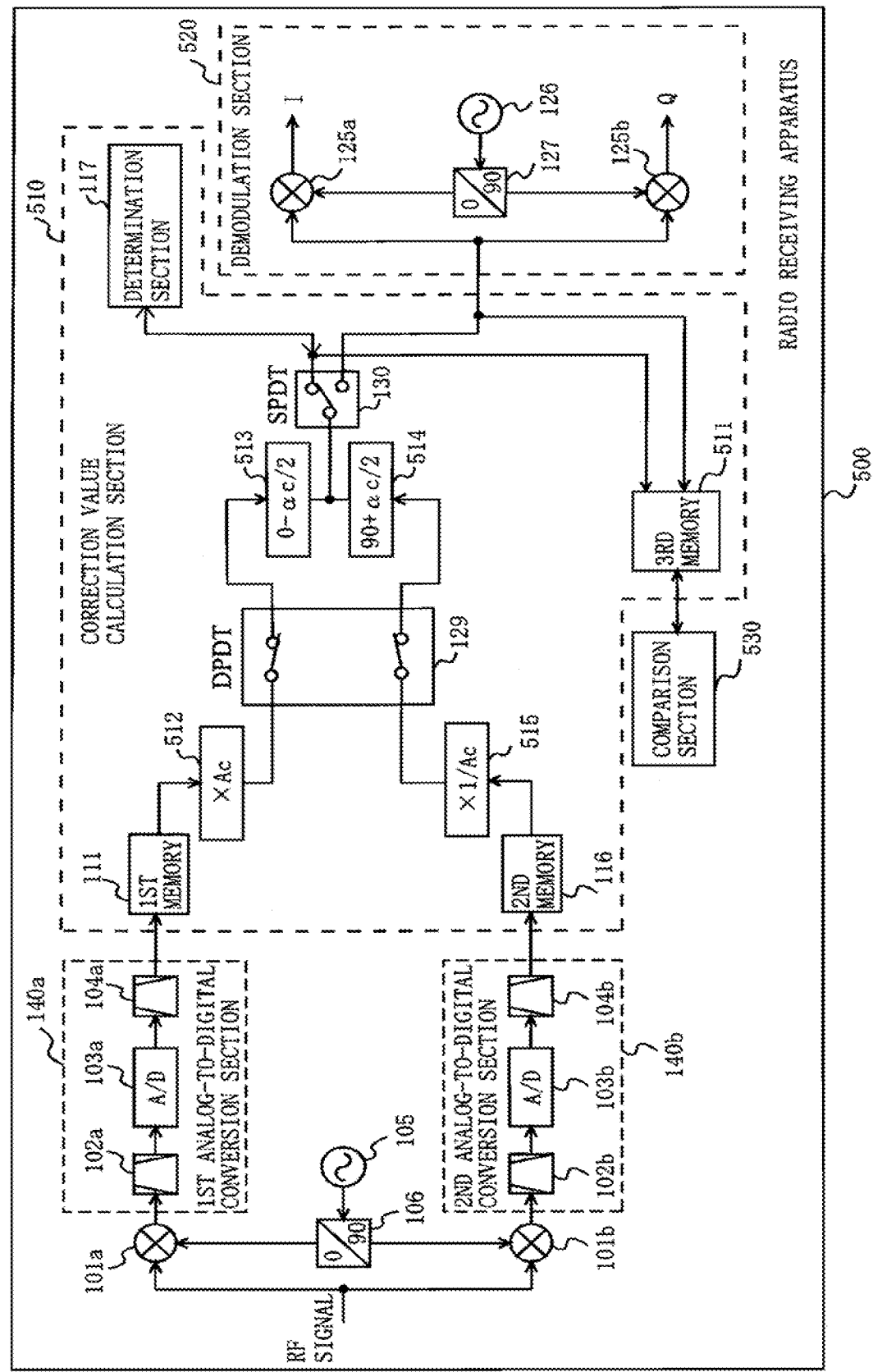
FIG. 10A is a block diagram (a first step) showing a functional structure of a radio receiving apparatus 500 according to an eighth embodiment of the present invention.

FIG. 10A is a block diagram showing a functional structure of a radio receiving apparatus 500 according to an eighth embodiment of the present invention. In FIG. 10A, elements having the same functions as those of the radio receiving apparatus 100 according to the first embodiment, as shown in FIG. 1A, will be denoted by the same reference numerals, and therefore will not be described.

In FIG. 10A, the radio receiving apparatus 500 includes a first down-converter 101a, a first analog-to-digital conversion section 140a, a second down-converter 101b, a second analog-to-digital conversion section 140b, a local oscillator 105, a first 90-degree phase shifter 106, a correction value calculation section 510, a demodulation section 520, and a comparison section 530.

The correction value calculation section 510 includes a first memory 111, a second memory 116, a third memory 511, a first multiplication section 512, a first phase shift section 513, a second phase shift section 514, a second multiplication section 515, an SPDT 130, and a determination section 117. The demodulation section 520 includes a third down-converter 125a, a fourth down-converter 125b, a clock generation section 126, and a second 90-degree phase shifter 127.

Figure 10B:
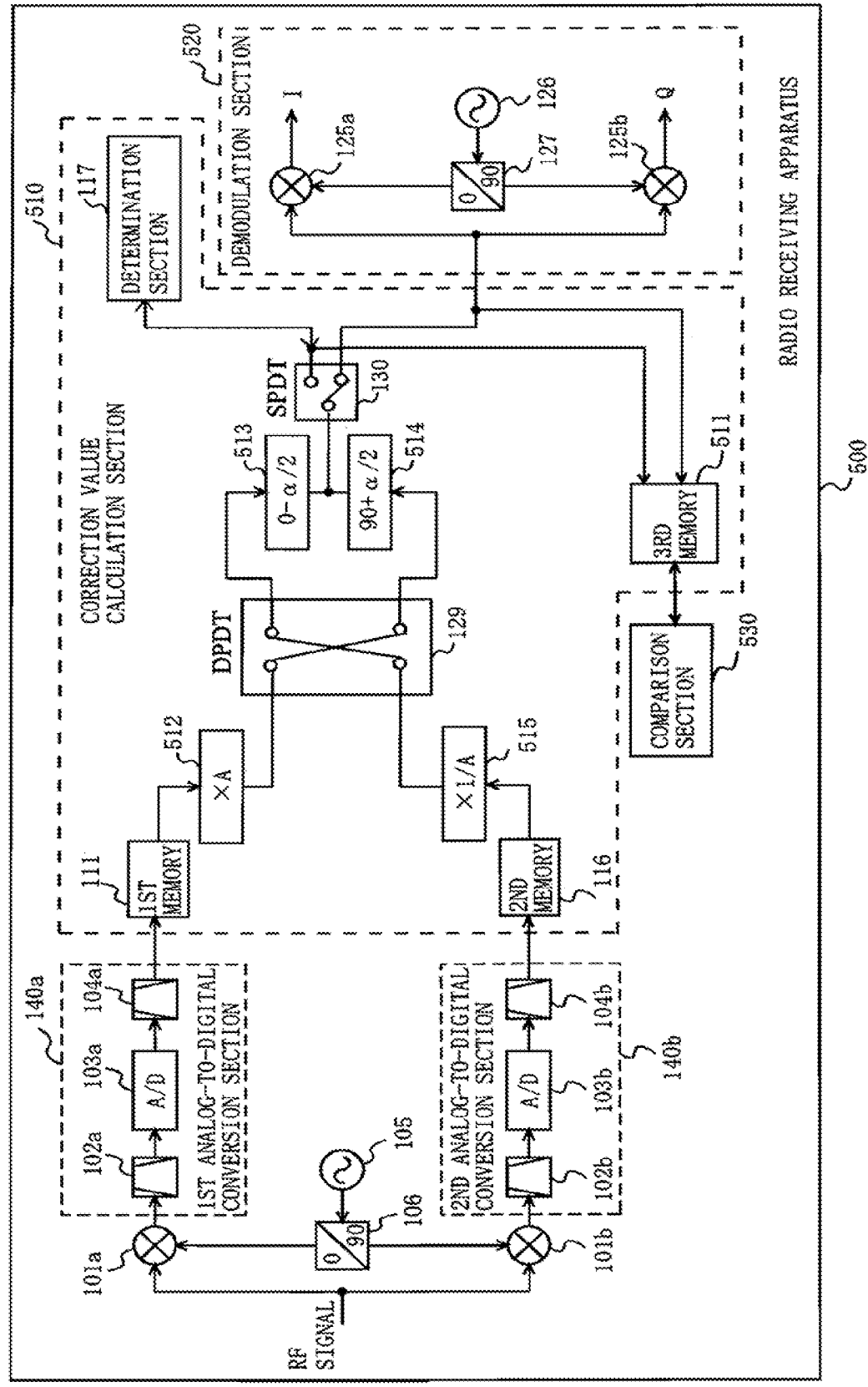
FIG. 10B is a block diagram (a second step) showing a functional structure of the radio receiving apparatus 500 according to the eighth embodiment of the present invention.
Figure 11:
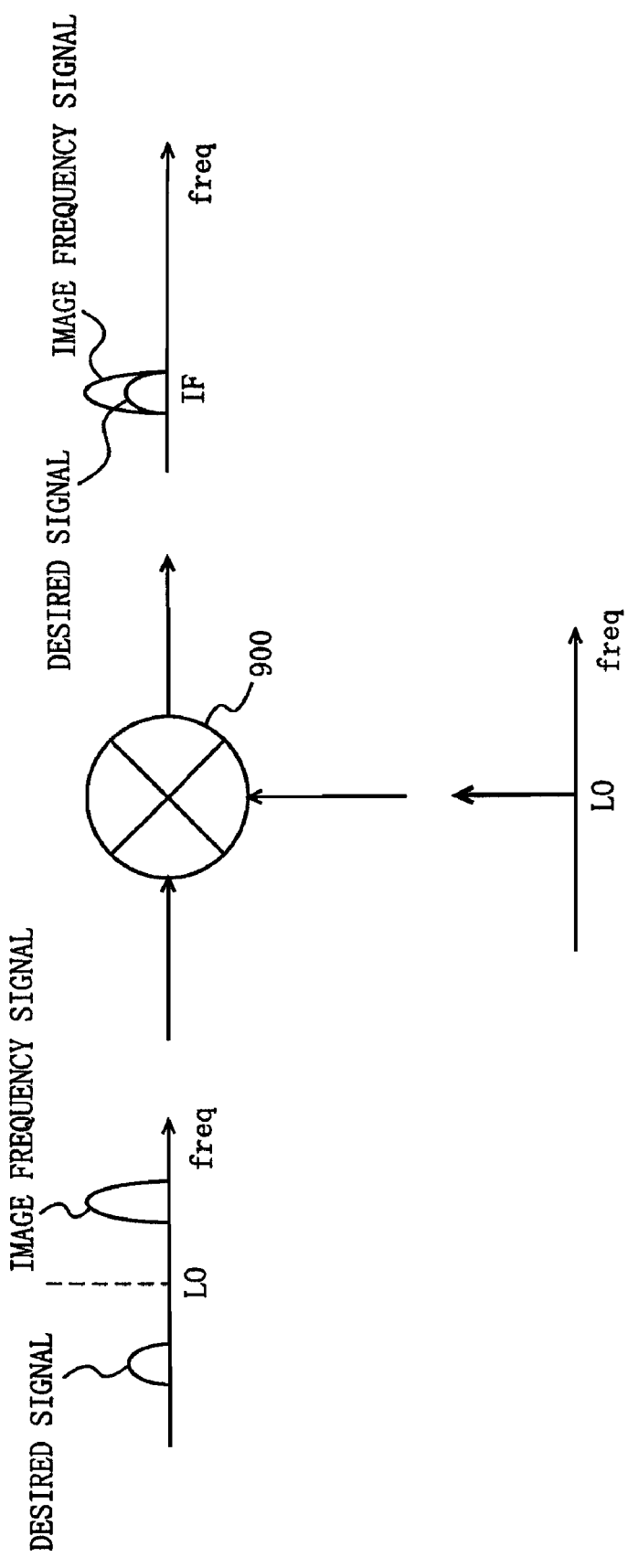
FIG. 11 is a diagram showing a mechanism of interference caused by an image frequency signal.
Figure 12A:
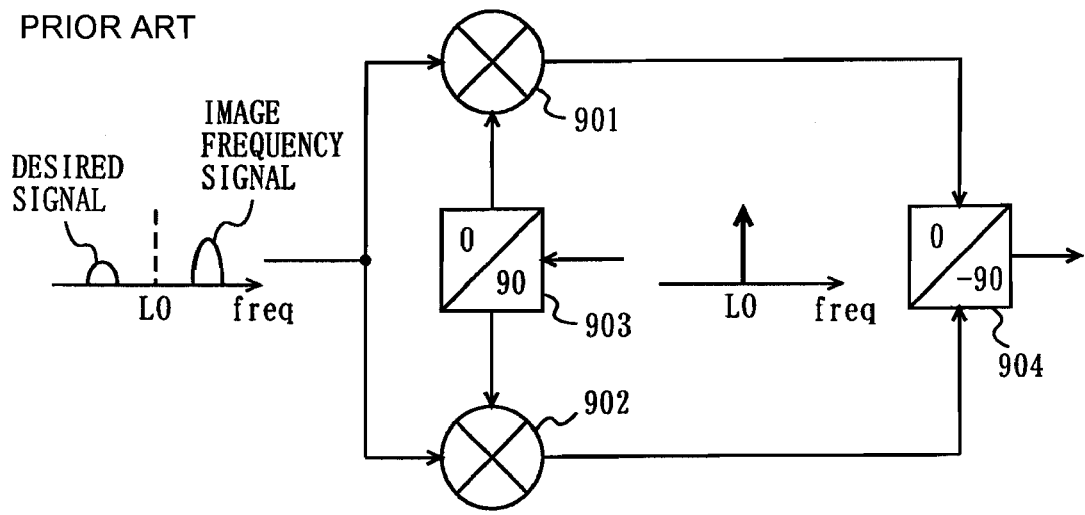
FIG. 12A is a block diagram showing a functional structure of a radio receiving apparatus employing the Hartley method.
Figure 12B:
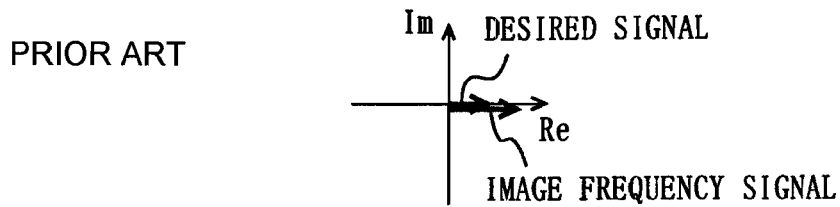
FIG. 12B is a block diagram showing a phase relationship between output signals from a first mixer 901 of FIG. 12A.
Figure 12C:
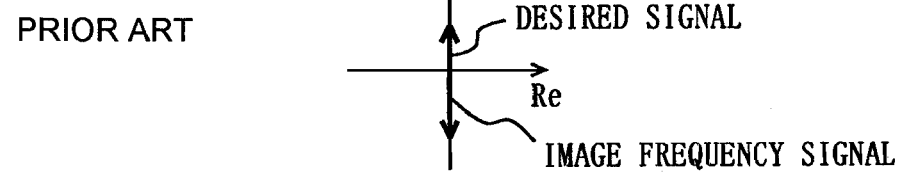
FIG. 12C is a block diagram showing a phase relationship between output signals from a second mixer 902 of FIG. 12A.
Figure 12D:
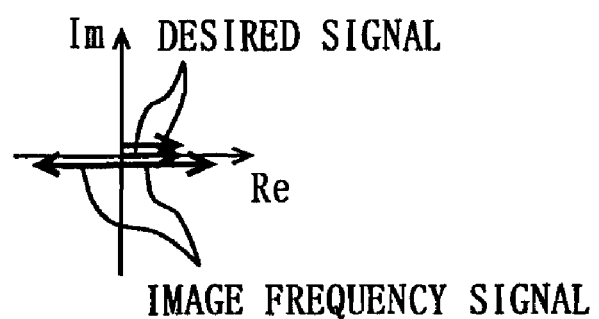
FIG. 12D is a diagram showing phase relationships among output signals from a second phase shifter 904 of FIG. 12A.
Figure 13:
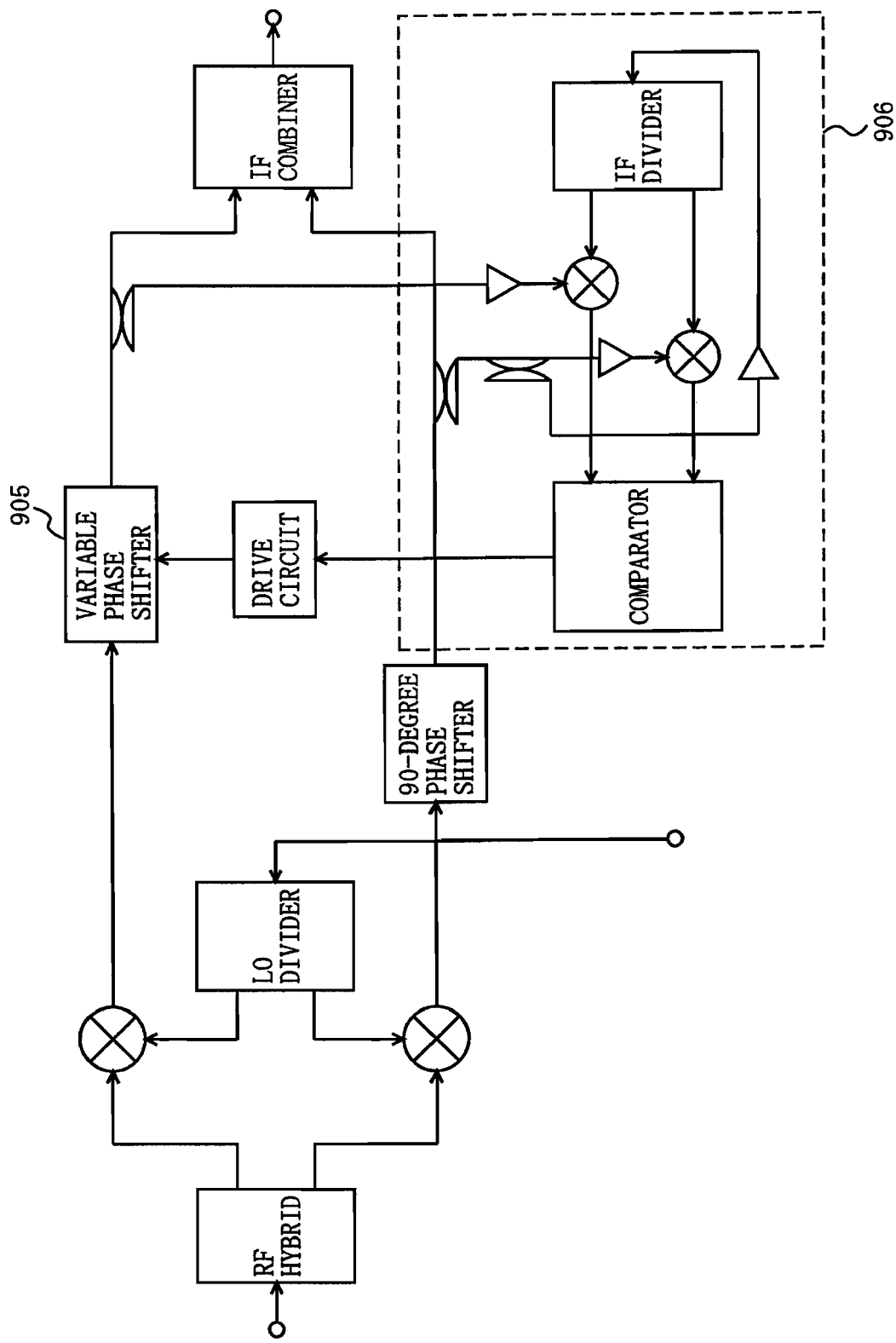
FIG. 13 is a block diagram showing a functional structure of a receiving circuit disclosed in Patent Document 1.
Figure 14:
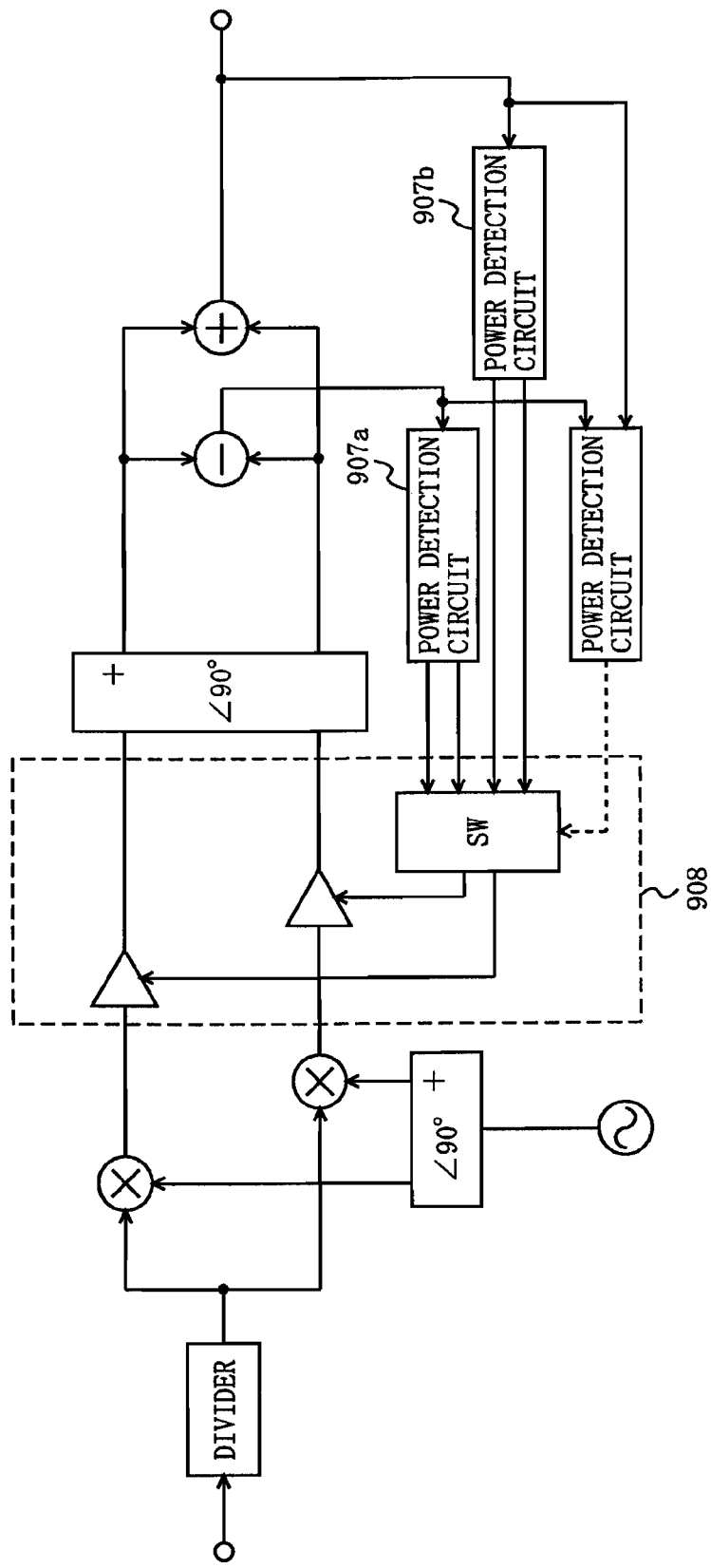
FIG. 14 is a block diagram showing a functional structure of a receiving circuit disclosed in Patent Document 2.
Figure 15:
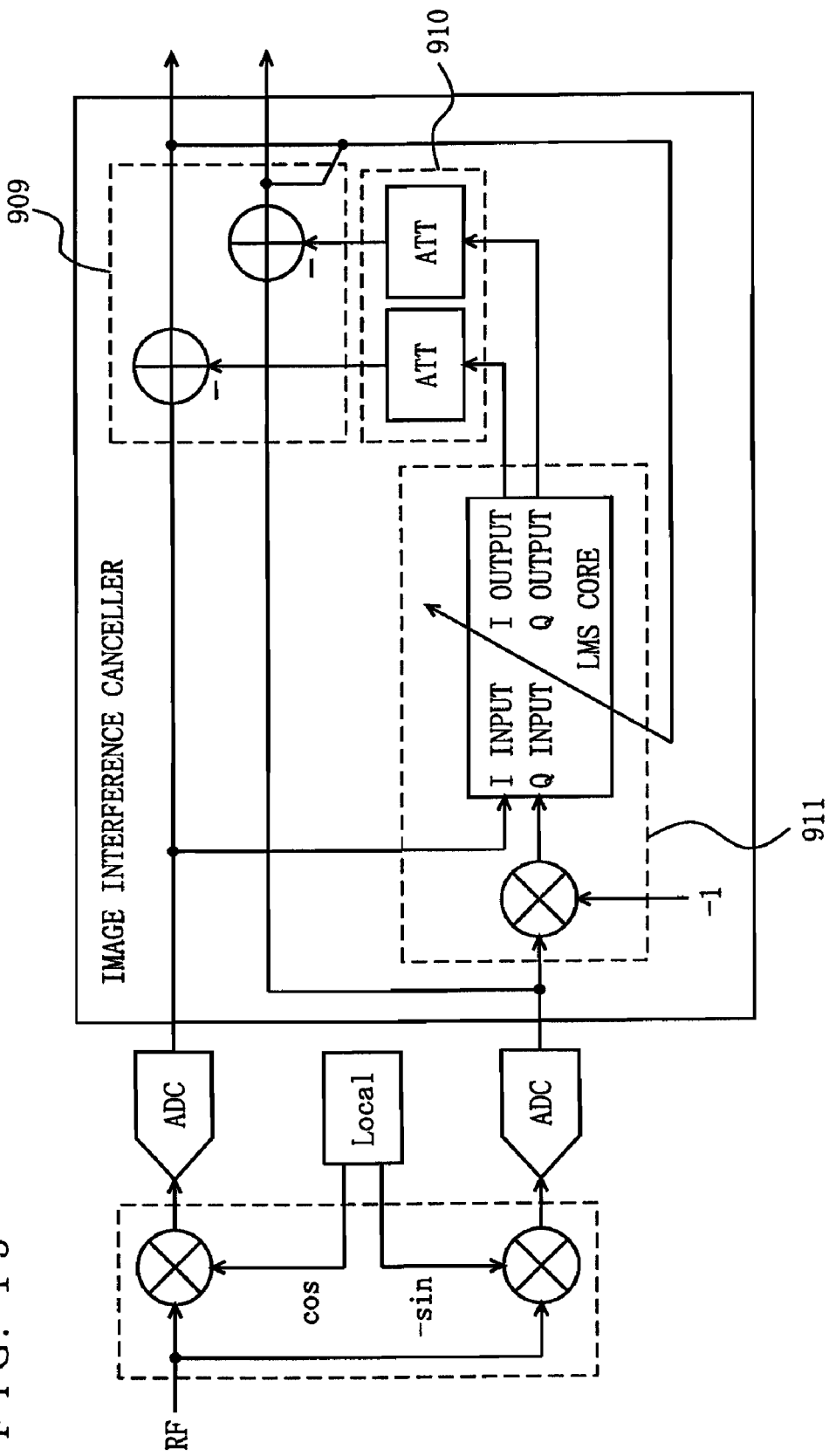
FIG. 15 is a block diagram showing a functional structure of a receiving circuit disclosed in Patent Document 3, Patent Document 4, and Patent Document 5.

The operation of the radio receiving apparatus 500 according to the eighth embodiment will be described below, in first and second steps, respectively. With reference to FIG. 10A, the operation of the radio receiving apparatus 500 in the first step will be described. With reference to FIG. 10B, the operation of the radio receiving apparatus 500 in the second step will be described.

In the first step, a DPDT 129 connects the first multiplication section 512 to the first phase shift section 513 and connects the second multiplication section 515 to the second phase shift section 514. Further, the SPDT 130 is connected to a determination section 117 side. In the first multiplication section 512, the correction value calculation section 510 multiplies a first digital signal stored in the first memory 111, by an amplitude correction candidate value Ac which is a candidate for an amplitude correction value. In the first phase shift section 513, the correction value calculation section 510 counter-rotates the phase of the multiplication result obtained in the first multiplication section 512 by a phase correction candidate value αc/2 degrees which is a candidate for a phase correction value. That is, the first phase shift section 513 rotates the phase of the multiplication result obtained in the first multiplication section 512 by (0−αc/2) degrees.

In the second multiplication section 515, the correction value calculation section 510 multiplies a second digital signal stored in the second memory 116, by 1/Ac which is the multiplicative inverse of the amplitude correction candidate value Ac. The correction value calculation section 510 rotates the phase of the multiplication result obtained in the second multiplication section 515 by 90 degrees and by the phase correction candidate value αc/2 degrees. That is, the second phase shift section 514 rotates the phase of the multiplication result obtained in the second multiplication section 515 by (90+αc/2) degrees. Accordingly, the angle of the phase rotation performed in the first phase shift section 513 and the angle of the phase rotation performed in the second phase shift section 514 are in a quadrature phase relationship (a quadrature relationship).

The correction value calculation section 510 combines the first digital signal obtained in the first phase shift section 513, with the second digital signal obtained in the second phase shift section 514, so as to obtain a first combined signal. The first combined signal is inputted to the determination section 117 and the third memory 511. The determination section 117 calculates an amplitude correction value A and a phase correction value α/2, using a method similar to that used in the first embodiment. The amplitude correction value A, the phase correction value α/2, and the first combined signal are stored in the third memory 511.

Next, in the second step, the DPDT 129 connects the first multiplication section 512 to the second phase shift section 514 and connects the second multiplication section 515 to the first phase shift section 513. Further, the SPDT 130 is connected to a demodulation section 520 side. In the first multiplication section 512, the correction value calculation section 510 multiplies the first digital signal stored in the first memory 111, by the amplitude correction value A with reference to the third memory 511. The correction value calculation section 510 rotates the phase of the multiplication result obtained in the first multiplication section 512 by 90 degrees and by the phase correction value α/2 degrees. That is, the second phase shift section 514 rotates the phase of the multiplication result obtained in the first multiplication section 512 by (90+α/2) degrees.

In the second multiplication section 515, the correction value calculation section 510 multiplies the second digital signal stored in the second memory 116, by 1/A which is the multiplicative inverse of the amplitude correction value A, with reference to the third memory 511. In the first phase shift section 513, the correction value calculation section 510 counter-rotates the phase of the multiplication result obtained in the second multiplication section 515 by the phase correction value a/2 degrees. That is, the first phase shift section 513 rotates the phase of the multiplication result obtained in the second multiplication section 515 by (0−α/2) degrees.

The correction value calculation section 510 combines the first digital signal obtained in the second phase shift section 514, with the second digital signal obtained in the first phase shift section 513, so as to obtain a second combined signal. The second combined signal is inputted to the third memory 511 and the demodulation section 520. The third memory 511 stores the second combined signal.

In the demodulation section 520, the third down-converter 125a, the fourth down-converter 125b, the clock generation section 126, and the second 90-degree phase shifter 127 output an in-phase component (I) and a quadrature component (Q) from the second combined signal, using a method similar to that used in the first embodiment. The comparison section 530 performs an operation in a similar manner to that performed in the first embodiment, except to read the first and second combined signals from the third memory 511.

As described above, in the radio receiving apparatus 500 according to the eighth embodiment, the correction value calculation section 510 calculates the amplitude correction value A and the phase correction value α/2 in the first step and makes corrections to the first and second digital signals by the amplitude correction value A and the phase correction value α/2 in the second step. Thus, it is possible to make the circuit size smaller than those used in the above embodiments.

Note that in each of the above embodiments, the first analog-to-digital conversion section 140a may include a first channel selection filter for selecting a desired channel from a first IF signal so as to allow the selected desired channel to pass therethrough and may include a first analog-to-digital converter for converting the output from the first channel selection filter into a digital signal. Additionally, the second analog-to-digital conversion section 140b may include a second channel selection filter for selecting a desired channel from a second IF signal so as to allow the selected desired channel to pass therethrough and may include a second analog-to-digital converter for converting the output from the second channel selection filter into a digital signal.

Note that in each of the above embodiments, the correction value calculation section may perform, immediately after the demodulation section completes one set of corrections, calculations for the next corrections and may continue to calculate an amplitude correction value and a phase correction value, such that the demodulation section can make corrections continuously.

Note that in each of the above embodiments, the correction value calculation section may perform calculations for corrections only in the first portion of a data frame of an RF signal. Thus, it is possible to reduce receiver sensitivity degradation caused by image suppression in the data frame and reduce power consumed for calculations performed for corrections.

Note that in each of the above embodiments, the correction value calculation section may perform calculations for corrections only when receiving a training signal of each frame of an RF signal. Thus, it is possible to reduce effects on receiver sensitivity, since data is not transmitted or received at the above-described timing.

Industrial Applicability

A radio receiving apparatus according to the present invention is capable of making compensation for both amplitude variations and phase variations and of suppressing image interference in a short period of time, and therefore is useful for a mobile terminal and the like, particularly a multimode and/or multiband mobile terminal and the like.

The invention claimed is:
1. A radio receiving apparatus for frequency-converting a radio frequency signal into an intermediate frequency signal and demodulating the radio frequency signal, the radio receiving apparatus comprising:
  a frequency conversion section for converting the radio frequency signal into first and second intermediate frequency signals, based on two local oscillation signals in phases 90 degrees different from each other;
  a first analog-to-digital conversion section for converting the first intermediate frequency signal into a first digital signal;
  a second analog-to-digital conversion section for converting the second intermediate frequency signal into a second digital signal;
  a demodulation section for making corrections to amplitudes and phases of the first and second digital signals and for rejecting image frequency signals from the first and second digital signals, so as to convert the obtained signals into signals of a baseband bandwidth; and a correction value calculation section for obtaining, by calculations, an amplitude correction value and a phase correction value which are used for making corrections to the amplitudes and the phases of the first and second digital signals in the demodulation section, wherein the correction value calculation section combines a first signal, which is obtained by multiplying the first digital signal by an amplitude correction candidate value and rotating the phase of the first digital signal, with a second signal, which is obtained by multiplying the second digital signal by a multiplicative inverse of the amplitude correction candidate value and performing, for the second digital signal, phase rotation which is in a quadrature relationship to phase rotation performed for the first digital signal, so as to obtain a first combined signal, and wherein the correction value calculation section includes a determination section that (i) obtains an inflection point of the first combined signal, and (ii) inputs, to the demodulation section, the amplitude correction candidate value and the phase correction candidate value, which correspond to the inflection point, as the amplitude correction value and the phase correction value, respectively.

2. The radio receiving apparatus according to claim 1, wherein the correction value calculation section combines a third signal, which is obtained by multiplying the first digital signal by the amplitude correction candidate value and counter-rotating the phase of the first digital signal by the phase correction candidate value, with a fourth signal, which is obtained by multiplying the second digital signal by the multiplicative inverse of the amplitude correction candidate value and rotating the phase of the second digital signal by 90 degrees and by the phase correction candidate value, so as to obtain the first combined signal.

3. The radio receiving apparatus according to claim 2, wherein the determination section obtains the inflection point by two-dimensional matrix calculations.

4. The radio receiving apparatus according to claim 2, wherein the correction value calculation section fixes the phase correction candidate value as 0 degrees in order to obtain, by one-dimensional matrix calculations, an amplitude correction candidate value for minimizing a level of the first combined signal, and fixes the amplitude correction candidate value as the obtained amplitude correction candidate value in order to obtain, by one-dimensional matrix calculations, a phase correction candidate value for maximizing the level of the first combined signal, so as to set the obtained amplitude correction candidate value and the obtained phase correction candidate value as the amplitude correction value and the phase correction value, respectively.

5. The radio receiving apparatus according to claim 2, wherein the correction value calculation section fixes the amplitude correction candidate value as 0 dB in order to obtain, by one-dimensional matrix calculations, a phase correction candidate value for maximizing a level of the first combined signal, and fixes the phase correction candidate value as the obtained phase correction candidate value in order to obtain, by one-dimensional matrix calculations, an amplitude correction candidate value for minimizing the level of the first combined signal, so as to set the obtained phase correction candidate value and the obtained amplitude correction candidate value as the phase correction value and the amplitude correction value, respectively.

6. The radio receiving apparatus according to claim 2, wherein the correction value calculation section fixes the phase correction candidate value as 0 degrees in order to obtain, by sequential calculations, an amplitude correction candidate value for minimizing a level of the first combined signal, and fixes the amplitude correction candidate value as the obtained amplitude correction candidate value in order to obtain, by sequential calculations, a phase correction candidate value for maximizing the level of the first combined signal, so as to set the obtained amplitude correction candidate value and the obtained phase correction candidate value as the amplitude correction value and the phase correction value, respectively.

7. The radio receiving apparatus according to claim 2, wherein the correction value calculation section fixes the amplitude correction candidate value as 0 dB in order to obtain, by sequential calculations, a phase correction candidate value for maximizing a level of the first combined signal, and fixes the phase correction candidate value as the obtained phase correction candidate value in order to obtain, by sequential calculations, an amplitude correction candidate value for minimizing the level of the first combined signal, so as to set the obtained phase correction candidate value and the obtained amplitude correction candidate value as the phase correction value and the amplitude correction value, respectively.

8. The radio receiving apparatus according to claim 2, wherein the demodulation section rejects the image frequency signals by the Hartley method.

9. The radio receiving apparatus according to claim 8, wherein the demodulation section (i) combines a fifth signal, which is obtained by multiplying the first digital signal by the amplitude correction value and rotating the phase of the first digital signal by the phase correction value, with a sixth signal, which is obtained by multiplying the second digital signal by a multiplicative inverse of the amplitude correction value, rotating the phase of the second digital signal by minus 90 degrees, and counter-rotating the phase of the second digital signal by the phase correction value, so as to obtain a second combined signal, and (ii) converts the second combined signal into a signal of the baseband bandwidth.

10. The radio receiving apparatus according to claim 9, further comprising a comparison section for comparing a level of the first combined signal obtained in the correction value calculation section, to a level of the second combined signal obtained in the demodulation section, and for causing the demodulation section to make corrections only when the level of the first combined signal is more than a predetermined value greater than the level of the second combined signal.

11. The radio receiving apparatus according to claim 2, wherein the demodulation section rejects the image frequency signals by the Weaver method.

12. The radio receiving apparatus according to claim 11, wherein the demodulation section:
multiplies a fifth signal, which is obtained by multiplying the first digital signal by the amplitude correction value, by a sixth signal, which is obtained by rotating a phase of a clock signal by the phase correction value, so as to obtain a seventh signal;
multiplies an eighth signal, which is obtained by multiplying the second digital signal by a multiplicative inverse of the amplitude correction value, by a ninth signal, which is obtained by rotating the phase of the clock signal by 90 degrees and by the phase correction value, so as to obtain a tenth signal;
multiplies the fifth signal by an eleventh signal, which is obtained by rotating the phase of the clock signal by minus 90 degrees and counter-rotating the phase of the clock signal by the phase correction value, so as to obtain a twelfth signal;

multiplies the eighth signal by the sixth signal so as to obtain a thirteenth signal;

sets a combined signal of the seventh signal and the tenth signal as an in-phase component; and sets a combined signal of the twelfth signal and the thirteenth signal as a quadrature component.

13. The radio receiving apparatus according to claim 12, further comprising a comparison section for comparing a level of the first combined signal obtained in the correction value calculation section, to sizes of vectors of the in-phase component and the quadrature component which are obtained in the demodulation section, and for causing the demodulation section to make corrections only when the level of the first combined signal is more than a predetermined value greater than the sizes of the vectors.

14. The radio receiving apparatus according to claim 1, wherein the correction value calculation section continuously performs calculations for corrections.

15. The radio receiving apparatus according to claim 1, wherein the correction value calculation section performs calculations for corrections only in a first portion of a data frame of the radio frequency signal.

16. The radio receiving apparatus according to claim 1, wherein the correction value calculation section performs calculations for corrections only when receiving a training signal of a data frame of the radio frequency signal.

17. The radio receiving apparatus according to claim 1, wherein
the correction value calculation section performs calculations for corrections when power is turned on, so as to obtain the amplitude correction value and the phase correction value in advance, and
the demodulation section makes corrections based on the amplitude correction value and the phase correction value which are obtained in advance.

18. The radio receiving apparatus according to claim 17, wherein the correction value calculation section performs calculations for corrections based on a radio frequency signal outputted from a transmission circuit when power is turned on, so as to obtain the amplitude correction value and the phase correction value in advance.

19. The radio receiving apparatus according to claim 18, wherein, when having received a radio frequency signal corresponding to a frequency different from a frequency of the radio frequency signal outputted from the transmission circuit, the correction value calculation section newly performs calculations for corrections based on the received radio frequency signal.

20. The radio receiving apparatus according to claim 1, wherein
the radio receiving apparatus obtains the intermediate frequency signals by a Low-IF method, and
the determination section performs symbol synchronization of the image frequency signals corresponding to adjacent channels, so as to obtain the inflection point at timing for stabilizing an envelope of a reproduced symbol.

21. The radio receiving apparatus according to claim 1, wherein the demodulation section makes corrections to an amplitude and a phase of each frequency component of digital-Fourier-transformed first and second digital signals, rejects an image frequency signal from the digital-Fourier-transformed first and second digital signals, inverse-digital-Fourier-transforms each frequency component obtained after the corrections and the image frequency rejection, and down-converts a signal, obtained by the inverse digital Fourier transform, to the baseband bandwidth, wherein the correction value calculation section combines a third signal, which is obtained by multiplying each frequency component of the digital-Fourier-transformed first digital signal by the amplitude correction candidate value and rotating the phase of each frequency component of the digital-Fourier-transformed first digital signal, with a fourth signal, which is obtained by multiplying each frequency component of the digital-Fourier-transformed second digital signal by the multiplicative inverse of the amplitude correction candidate value and performing, for each frequency component of the digital-Fourier-transformed second digital signal, rotation which is in a quadrature relationship to rotation performed for each frequency component of the first digital signal, in order to obtain the first combined signal, and wherein the determination section that obtains the inflection point of each frequency component of the first combined signal, in order to input, to the demodulation section, the amplitude correction candidate value and the phase correction candidate value, which correspond to the inflection point, as the amplitude correction value and the phase correction value, respectively, which correspond to each frequency component, so as to cause the demodulation section to make corrections to the amplitudes and the phases of the first and second digital signals.

22. The radio receiving apparatus according to claim 1, wherein
the first analog-to-digital conversion section includes:
a first antialiasing filter for preventing a frequency causing aliasing from passing therethrough, so as to allow the first intermediate frequency signal to pass therethrough;
a first analog-to-digital converter for converting output from the first antialiasing filter into a digital signal; and
a first channel selection filter for selecting a desired channel from output from the first analog-to-digital converter, so as to output the selected desired channel as the first digital signal, and
the second analog-to-digital conversion section includes:
a second antialiasing filter for preventing a frequency causing aliasing from passing therethrough, so as to allow the second intermediate frequency signal to pass therethrough;
a second analog-to-digital converter for converting output from the second antialiasing filter into a digital signal; and
a second channel selection filter for selecting a desired channel from output from the second analog-to-digital converter, so as to output the selected desired channel as the first second digital signal.

23. The radio receiving apparatus according to claim 1, wherein
the first analog-to-digital conversion section includes:
a first channel selection filter for selecting a desired channel from the first intermediate frequency signal, so as to allow the selected desired channel to pass therethrough; and
a first analog-to-digital converter for converting output from the first channel selection filter into a digital signal, and the second analog-to-digital conversion section includes:
- a second channel selection filter for selecting a desired channel from the second intermediate frequency signal, so as to allow the selected desired channel to pass therethrough; and
- a second analog-to-digital converter for converting output from the second channel selection filter into a digital signal.

24. A radio receiving apparatus for frequency-converting a radio frequency signal into an intermediate frequency signal and demodulating the radio frequency signal, the radio receiving apparatus comprising:
- a frequency conversion section for converting the radio frequency signal into first and second intermediate frequency signals, based on two local oscillation signals in phases 90 degrees different from each other;
- a first analog-to-digital conversion section for converting the first intermediate frequency signal into a first digital signal;
- a second analog-to-digital conversion section for converting the second intermediate frequency signal into a second digital signal;
- a correction value calculation section for obtaining, by calculations, an amplitude correction value and a phase correction value which are used for making corrections to amplitudes and phases of the first and second digital signals, for making corrections to the amplitudes and the phases of the first and second digital signals, using the amplitude correction value and the phase correction value, and for rejecting image frequency signals from the first and second digital signals; and
- a demodulation section for converting signals obtained by rejecting the image frequency signals into signals of a baseband bandwidth, wherein the correction value calculation section combines a first signal, which is obtained by multiplying the first digital signal by an amplitude correction candidate value and rotating the phase of the first digital signal, with a second signal, which is obtained by multiplying the second digital signal by a multiplicative inverse of the amplitude correction candidate value and performing, for the second digital signal, phase rotation which is in a quadrature relationship to phase rotation performed for the first digital signal, so as to obtain a first combined signal, and wherein the correction value calculation section includes a determination section that (i) obtains an inflection point of the first combined signal, and (ii) sets the amplitude correction candidate value and the phase correction candidate value, which correspond to the inflection point, as the amplitude correction value and the phase correction value, respectively.

25. The radio receiving apparatus according to claim 24, wherein
in order to make corrections to the amplitudes and the phases of the first and second digital signals, the correction value calculation section combines a third signal, which is obtained by multiplying the first digital signal by the amplitude correction value and rotating the phase of the first digital signal by 90 degrees and by the phase correction value, with a fourth signal, which is obtained by multiplying the second digital signal by the multiplicative inverse of the amplitude correction value and counter-rotating the phase of the second digital signal by the phase correction value, so as to obtain a second combined signal, and
the demodulation section converts the second combined signal into a signal of the baseband bandwidth.

* * * * *